United States Patent

Baba et al.

[11] Patent Number: 5,943,662
[45] Date of Patent: Aug. 24, 1999

[54] SUPPORTING METHOD AND SYSTEM FOR PROCESS OPERATION

[75] Inventors: Kenji Baba; Ichiro Enbutsu; Shoji Watanabe; Hayao Yahagi; Fumio Maruhashi; Harumi Matsuzaki, all of Hitachi; Hiroshi Matsumoto, Naka-gun; Shunsuke Nogita, Hitachi; Mikio Yoda, Naka-gun; Naoki Hara, Hitachi, all of Japan

[73] Assignee: Hitachi, Ltd., Tokyo, Japan

[21] Appl. No.: 08/220,546

[22] Filed: Mar. 31, 1994

Related U.S. Application Data

[62] Division of application No. 07/613,718, Dec. 23, 1991, Pat. No. 5,774,633, which is a continuation of application No. PCT/JP90/00322, Mar. 13, 1990.

[30] Foreign Application Priority Data

Mar. 13, 1989 [JP] Japan ............................ 1-57759
Jul. 27, 1989 [JP] Japan ............................ 1-194898

[51] Int. Cl.$^6$ .................................................. G06F 15/18
[52] U.S. Cl. .............................. 706/23; 706/2; 706/12; 706/25
[58] Field of Search ........................ 395/22, 3, 61, 395/51, 900, 903, 906; 706/2, 12, 25, 23

[56] References Cited

U.S. PATENT DOCUMENTS

| | | | |
|---|---|---|---|
| 3,287,649 | 11/1966 | Rosenblatt | 706/38 |
| 4,774,677 | 9/1988 | Buckley | 706/26 |
| 4,912,647 | 3/1990 | Wood | 706/25 |
| 4,989,256 | 1/1991 | Buckley | 706/41 |
| 5,023,045 | 6/1991 | Watanabe et al. | 706/20 |
| 5,092,343 | 3/1992 | Spitzer et al. | 706/20 |
| 5,093,792 | 3/1992 | Taki et al. | 706/20 |
| 5,109,475 | 4/1992 | Kosak et al. | 706/19 |
| 5,129,039 | 7/1992 | Hiraiwa | 706/25 |
| 5,131,072 | 7/1992 | Yoshizawa | 706/27 |
| 5,195,169 | 3/1993 | Kamiya et al. | 706/15 |
| 5,515,454 | 5/1996 | Buckley | 706/14 |

FOREIGN PATENT DOCUMENTS

| | | |
|---|---|---|
| 62-239278 | 10/1987 | Japan . |
| 1-275381 | 11/1989 | Japan . |
| 7-130748 | 5/1997 | Japan . |

OTHER PUBLICATIONS

Fujitsu, Neurocomputer and its Application to Robot Control, by S. Nagata, et al., et al.1988–6, vol. 39, No. 3.
Control Engineering, Feb. 1975, New York, U.S., pp. 50–53, Can a process "Train" its control system? by S.J. Bailey.
*Biological Cybernetics*, "A hierarchical Neural–Network Model for Control and Learning of Voluntary Movement", M. Kawato, et al., vol. 57, No. 3, Oct. 1987.
*Advances in Instrumentation*, "Applications of Artificial Neural Systems in Robotic Welding", by B.A. Cleveland, vol. 43, No. Part 04, Jan. 1, 1988.
"Suidokyokai Zasshi (Journal of Water Service Workers' Association)", No. 431, p. 28, Aug. 1970.

(List continued on next page.)

*Primary Examiner*—Robert W. Downs
*Attorney, Agent, or Firm*—Antonelli, Terry, Stout & Kraus, LLP

[57] ABSTRACT

A method and a system for causing a neural circuit model to learn typical past control results of a process and using the neural circuit model for supporting an operation of the process. The neural circuit model is caused to learn by using, as input signals, a typical pattern of values of input variables at different points in time and, as a teacher signal, its corresponding values of the control variable. An unlearned pattern of input variables is inputted to the thus-learned neuron circuit model, whereby a corresponding value of the control variable is determined. Preferably, plural patterns at given time intervals can be simultaneously used as patterns to be learned.

2 Claims, 16 Drawing Sheets

OTHER PUBLICATIONS

Parallel Disributed Processing; "Learning Internal Representations by Error Propagation" Vol. 1: Foundations, The MIT Press 1986 by David E. Rumelhart, James L. McClelland and the PDP Research Group.

Learning Internal Representations in the Coulomb Energy Network, Scofield, Jul. 1988, pp. 271–276.

"A Class of Gradient–Estimating Algorithms for Reinforcement Learning in Neural Networks"IEEE 1st International Conference on Neural Networks by Ronald J. Williams, Jun. 1987.

"A Learning Algorithm for Analog Full Recurrent Neural Networks" by Michael Gherrity, Jun. 18, 1980.

"Training Time–Dependence in Neural Networks", IEEE 1st International Conference on Neural Networks by Richard Rohwer, Jun. 1987.

"Neural Networks Primer" AI Expert, Feb. 1989.

"Layered Neural Nets for Pattern Recognition" by Widrow, et al., Speech and Signal Processing, vol. 36, No. 7, Jul. 1988.

Phoneme Recognition: Neural Networks vs. Hidden Markov Models, IEEE ICASSP Conference by Waibel, et al., 1988.

"Neural Network Model using a normalized inner product as measure of similarity", IEEE ICNN by Macukow, et al., 1988.

"Applications of counterpropagation Networks", Neural Networks, Vol. 1, pp. 131–139 by Robert Hecht–Nielsen, 1988.

"The implementation of Multi–Layer perceptrons on Transputer Networks", PPTBM, Proceedings of the 7th OCCAM User, 1987.

"Neural Networks, Part 2:" IEEE Expert, 1988.

Wasserman etal ,"Neural Networks, Part 2:" 1988 IEEE Expert.

Williams et al,"A Class of Gradient–Estimating Algorithms for Reinforcement Learning in Neural Networks" IEEE Ist Inter. Conf. on Neural Networks, Jun. 1987.

Gherrity et al,"A Learning Algorithm for Analog, Fully Recurrent Neural Networks"Jun. 18, 1998O.

Rohwer et al,"Training Time–Dependence in Neural Networks" IEEE first Inter. Conf. on Neural Networks, Jun. 1987.

"Neural Networks Primer" AI Expert, Feb. 1989.

"Learning Internal Representations in the Coulomb Energy Network", Scofield, Jul. 1988, pp. 271–276.

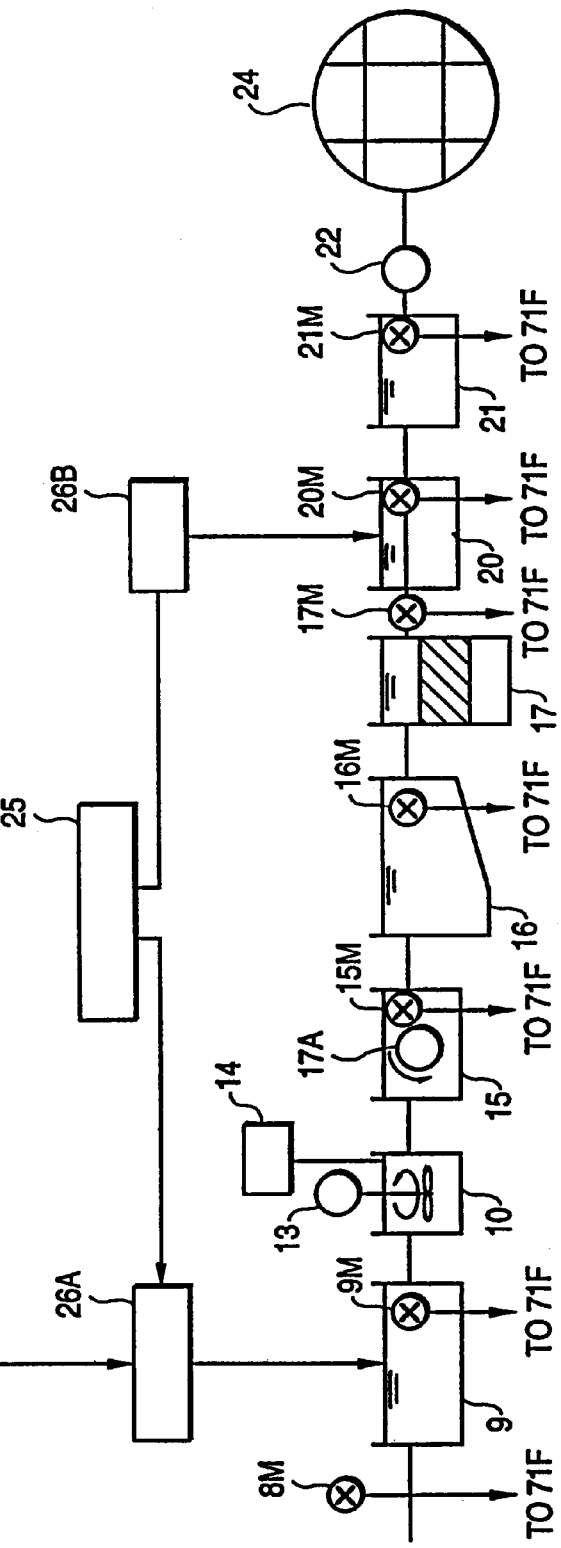

SUPPORTING METHOD AND SYSTEM FOR PROCESS OPERATION

This is a divisional of application Ser. No. 07/613,718, filed Dec. 23, 1991 now U.S. Pat. No. 5,774,633, issued Jun. 30, 1998 which is a continuation of PCT/JP90/00322 filed on Mar. 13 1990.

TECHNICAL HELD

The present invention relates generally to a method and a system for supporting an operation of a process wherein at least one phenomenon which varies with time is dealt with.

BACKGROUND ART

Conventional methods of operation (or managing) various processes wherein at least one phenomenon which varies with time is dealt with—such as water treatment processes; river information processing processes; meteorological information processing processes; thermal, nuclear and hydraulic power generation processes; co-generation processes; chemical processes; biological processes, security/exchange information processing processes, and bank management information processing processes—are practiced using formula models which describe these processes.

It is however impossible to convert a process into a formula model unless casualities or causal relationships among a group of variables describing the process have been made clear. On the other hand, when a logical model such as the "if then" rules is employed without using a formula model, application of such a logical model is infeasible unless a causal relationship between causes and the corresponding results have been ascertained. Needless to say, even in the case of a fuzzy method which makes combined use of a formula model and a logical model, its application is impossible unless both the models are described. A judgment and/or an operation (management) has therefore been carried out in the light of precedence or past experiences in such cases. In unusual cases or the like where neither cause nor result is known, an operator has conducted the operation on the basis of the past phenomenological history or his memory. Accordingly, it has been difficult to conduct a good operation all the time.

Further, described generally, these methods have not yet permitted any automated modification of the model structure or elements (rule, etc.). It has hence been difficult to flexibly cope with an actual phenomenon which varies in time.

SUMMARY OF THE INVENTION

An object of the invention is therefore to provide a method and a system for supporting an operation of a process, which can support the operation of the process in a steady state or a non-steady or abnormal state by making effective use of a past history which has not heretofore been used effectively.

Another object of the invention is to provide a method for automatically extracting knowledge such as a causal relationship between a value of an input variable and its corresponding output variable from a learned neural circuit model.

A process operation supporting method according to the invention is a method for supporting an operation of a process, which includes determination of a value of a control variable for a target, to be controlled, in accordance with values of time-dependent input variables so as to bring the target closer to a desired state. The method comprises the steps of providing a neuron circuit model of a hierarchical structure constructed of an input layer, at least one hidden layer and an output layer; causing the neuron circuit model to learn, out of information on a past operation history of the process, a typical pattern of values of input variables at different points in time as input signals and a value of the control variable, said control value corresponding to the typical pattern, as teacher signal; and inputting, as the values of the input variables, an unlearned pattern to the thus-learned neuron circuit model to determine its corresponding value of the control variable.

The process operation supporting method according to the invention is, in another aspect, a method for supporting an operation of a process, which includes determination of a value of a control variable for at least one target, to be controlled, in accordance with values of time-dependent input variables such that the target can be brought into a desired state. The method comprises the steps of providing a neuron circuit model of a hierarchical structure constructed of an input layer, at least one hidden layer and an output layer; causing the neuron circuit model to sequentially learn a plurality of patterns of values of input variables, each, by using, as input signals, patterns of values of the input variables at the times of attainment of control of the target into the desired state and, as teacher signals, values of the control variable, said values corresponding to the patterns; and inputting, as the values of the input variables, a given pattern of values of the input variables to the thus-learned neuron circuit model to determine a value of the control variable for said given pattern.

In these process operation supporting methods, a value of the control variable for a present time point can also be determined by learning plural input signals through the simultaneous use of a pattern of values of the input variables at a given time point and a pattern of values of the input variables at a time point a predetermined time interval before the given time point as input signals and also the use of a value of the control variable at the given time point as a teacher signal and then simultaneously inputting to the neuron circuit model a pattern of values of the input variables at the present time point and a pattern of values of the input variables at a time point a predetermined time interval before the present time point.

The process operation supporting method according to the invention is, in a further aspect, a method for supporting an operation of a process, which includes determination of a value of a control variable for a target, to be controlled, in accordance with values of time-dependent input variables so as to bring the target closer to a desired state. The method comprises the steps of providing a neuron circuit model of a hierarchical structure constructed of an input layer, at least one hidden layer and an output layer; causing the neuron circuit model to learn plural input signals by simultaneously using, as the input signals, at least two patterns of a pattern of values of the input variables at a given time point, a pattern of values of the input variables at a time point a predetermined time interval before the given time point and a pattern of differences between the values of the input variables at the former time point and those at the latter time point and using a value of the control variable at the given time point as a teacher signal; and inputting patterns at a present time point, said patterns corresponding to said at least two patterns, simultaneously to the thus-learned neuron circuit model to determine a value of the control variable for the present time.

Preferably, the operation of the process is supported by extracting causal relationships between the values of the input variables and the corresponding value of the control valuable on the basis of the results of the learning by the neuron circuit model and then using the causal relationships.

The neuron circuit model has, for example, an input layer formed of plural neuron element models, at least one hidden layer formed of plural neuron element models for receiving outputs from the neuron element models of the input layer and an output layer formed of at least one neuron element model for receiving outputs from the neuron element models of a last hidden layer. The input variables are assigned to the respective neuron element models of the input layer and the control variable is assigned to the neuron element model of the output layer. The learning is performed by controlling weight factors applied to connections between the individual neuron element models.

Further, the network of the neuron circuit model may be modified by determining the connection strengths between the individual input variables and the individual control valuables on the basis of the results of the learning by the neuron circuit model and then using the magnitudes of the connection strengths. In this case, the connection strength between a specific input variable and a specific control variable can be defined by the sum of products of weight factors for individual routes from the neuron element model, corresponding to the specific input variable, of the input layer to the neuron element model, corresponding to the specific control variable, of the output layer via the neuron element models of the hidden layer.

The modification of the network of the neuron circuit model can be achieved by eliminating the connection between particular neuron element models or by using a varied number of hidden layers.

It is also possible to independently provide a neuron circuit model which has learned information on a steady-state operation history and another neuron circuit model which has learned information on a non-steady-state operation history, and in supporting the operation, to switch over the neuron circuit models depending on whether the operation is to be in a steady state or in a non-steady state.

As an alternative, it is also possible to provide a plurality of neuron circuit models, which have learned information on different operation histories respectively, for variations of the pattern of values of the input variables, and in supporting the operation, to switch over the plurality of neuron circuit models depending on the variation of the pattern of values of the input variables.

A knowledge extracting method according to the invention is a method for extracting as knowledge causal relationships between input variables and an output variable of a neural circuit model. The neural circuit model is of a hierarchical structure constructed of an input layer, at least one hidden layer and an output layer and having performed learning a limited number of times by determining weight factors between mutually-connected neuron element models in different layers of the input layer, hidden layer and output layer. With respect to plural routes extending from a neuron element model, corresponding to a particular input variable, of the input layer to a neuron element model, corresponding to a particular output variable, of the output layer by way of the individual element models of the hidden layer, a product of the weight factors for each of the routes is determined, and the products for the plural routes are summed, whereby the sum is employed as a measure for the determination of the causal relationship between the particular input variable and the particular output variable.

A process operation supporting system according to the invention is a system for supporting an operation of a process, which includes determination of a value of a control variable for a target, to be controlled, in accordance with values of time-dependent input variables so as to bring the target closer to a desired state. The system comprises a processing means having a neural circuit model of a hierarchical structure constructed of an input layer, at least one hidden layer and an output layer, said neural circuit model having been allowed to learn results of an actual operation in the past by using information on the history of the past operation as input signals and a teacher signal; an input means for obtaining, from the target, input values of the input variables to be inputted to the neural circuit model; a knowledge extraction means for extracting knowledge from the learned neural circuit model; a knowledge base for accumulating the knowledge obtained by the knowledge extraction means; an inference system for obtaining process-operation-supporting information from the knowledge accumulated in the knowledge base; and a guidance means for performing guidance of the control of the target in accordance with an output from the processing means and/or an output from the inference system.

Incidentally, the term "process" as used herein embraces various processes wherein at least one phenomenon which varies with time is dealt with. The term "operation" should be interpreted in a broad sense so that it may mean operation, management, control or the like. Further, the term "to support an operation" means, in a narrow sense, to support an operator upon operation of a process but in a broad sense, includes direct control of a process without relying upon an operator.

The invention applies a learning function of a neural circuit model to (a) learning from information on an operation history of a process, (b) acquisition of history information as knowledge and (c) automated construction of a model describing the history information.

In causing a neural circuit model to learn, the neural circuit model is allowed to learn only typical patterns in each of which a successful operation was performed. This makes it possible to provide the neural circuit model with decision-making ability comparable with operators having abundant experiences, whereby the neural circuit model can perform a suitable support, which conforms to the past results and precedence, in response to an actual given pattern of input values of variables. Moreover, the ability of the neural circuit model can be progressively improved in the light of reality by allowing the neural circuit model to continue learning after the initiation of an actual operation of the process. It is therefore possible to ultimately aim at a uniform and optimal operation without relying upon the experiences, ability, quality and the like of each operator.

In some processes, the optimal value of a control variable may vary even for the same pattern of the values of the input variables depending upon whether the values of individual input variables are increasing or decreasing. With the foregoing circumstances in view, the simultaneous use of not only information on the operation history at a given time point but also information on the past operation history at a time point a predetermin~ed time interval before the given time point or information on the differences therebetween makes it possible to suitably support an operation in compliance with variations of a process. Still more effective support of an operation is feasible by providing discrete neural circuit models which have learned information on an operation history in a steady state, information on an operation history in an abnormal state, and the like, respectively.

In addition, there is possibility that knowledge, such as causal relationships which an operator is not aware of, may be contained in information on a past operation history. However, causal relationships between many input variables and control variables are not clear. Paying attention to the magnitudes of weight factors and the connections in a neural circuit model which has already learned, the present invention has hence made it possible to automatically extract and obtain the relationships between causes and the corresponding results. As a result, it is possible to automatically or semi-automatically put pieces of knowledge, which are contained in information on operation histories without being noticed, into a data base or a knowledge base successively. Here, the term "semi-automatically" means an interactive manner of operation by the operator. Operations of various processes in each of which at least one time-dependent phenomenon is dealt with can also be supported by such knowledge bases.

BEST MODE FOR CARRYING OUT THE INVENTION

Figure 1:
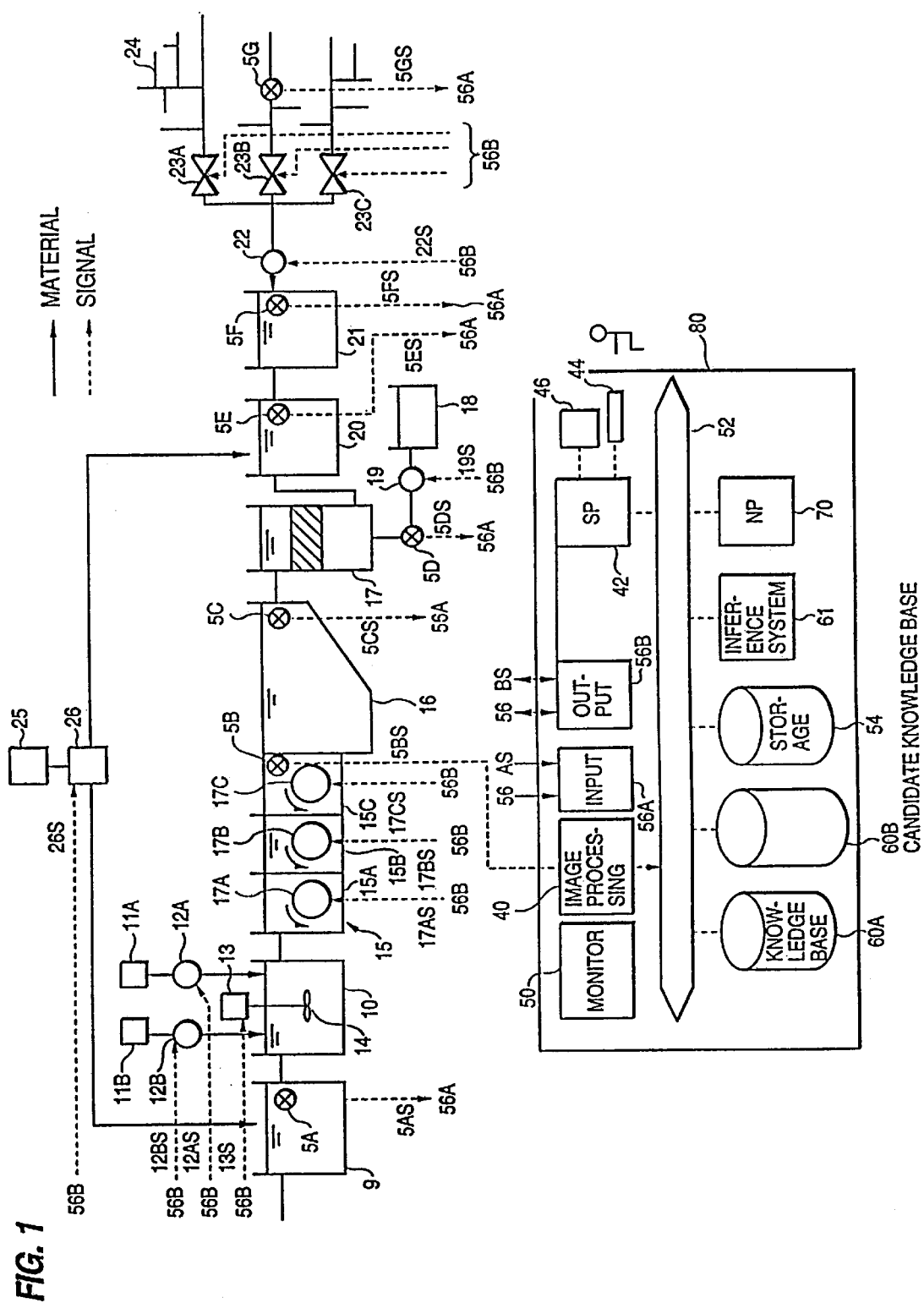
FIG. 1 is a block diagram of one embodiment of the present invention as applied for supporting an operation of a water purifying plant.

The present invention comprises the steps of: (1) causing a neural circuit model (neural processor) to learn typical patterns at different points in time out of patterns of values of multiple time-dependent input valuables, (2) supporting an operation on the basis of the results of the learning, (3) obtaining knowledge from the results of the learning and accumulating candidate knowledge, (4) diagnosing the reasonability of each candidate knowledge as knowledge, and (5) supporting the operation on the basis of the knowledge and inference. The patterns are patterns of multiple variables in past operation(s) or present operation. Although their detail description will be made below, the term "multiple variables" may include every variable which varies with time. The present invention can therefore be applied to various information processing processes or plants. Here, one embodiment of the present invention as used in the support of control of a water purifying plant will hereinafter be described with reference to FIG. 1.

First of all, the construction and operation of the entirety of FIG. 1 will be described.

A description will firstly be made of the flow of the water purifying plant. In FIG. 1, raw water derived from a river, lake or pond (not shown) is introduced into a receiving basin 9. The raw water is then guided from the receiving basin 9 to a high-speed mixing basin 10, where a flocculant (polychlorinated aluminum, aluminum sulfate or the like) in a liquid form is injected by a flocculant feed pump 12A from a flocculant tank 11A. To promote formation of flocs, an alkali agent such as calcium hydroxide or sodium carbonate is also injected by an alkali agent feed pump 12B from an alkali agent tank 11B. Inside the high-speed mixing basin 10, a stirring blade 14 is driven by a stirrer 13 so that fine particles of about 0.01 mm floating in the raw water are converted into microflocs of about 0.1 mm. The water is then introduced into a floc-forming basin 15, in which the microflocs are allowed to grow into flocs. The floc-forming basin 15 is composed of plural basins 15A, 15B and 15C. The individual basins are provided with stirring paddles 17A, 17B and 17C which rotate slowly. By this stirring, the microflocs are allowed to grow into flocs of about 1 mm in diameter. The flocs thus grown are allowed to settle in a settling basin 16, and the supernatant is filtered in the filtering basin 17. From a washing water tank 18, back washing water is intermittently jetted into the filtering basin 17 by a pump 19, whereby a filter bed is washed. Filtered water is temporarily stored in a purified water basin 20 and a water distribution basin 21, and is then delivered by a pump 22 to individual customers by way of a distributing pipe network 24. Valves 23A, 23B and 23C are provided to control the pressure and flow rate. For sterilization, chlorine is also injected by a chlorine feeder 26 at suitable rates into the receiving basin 9 and purified water basin 20 from a chlorine tank 25.

A description will next be made of instruments. To measure the quality of raw water, the receiving basin 9 is equipped with a measuring instrument 5A. Measured by the instrument 5A are water temperature, turbidity, alkalinity, pH, electrical conductivity, residual chlorine concentration, chlorine demand, water quantity, water level, and the like. The floc-forming basin 15C is provided with an image pickup means 5B such as a marine camera. Image pickup means may also be provided, as needed, in the high-speed mixing basin 10, the floc-forming basins 15A, 15B and/or the settling basin 16. The settling basin 16 is provided with a turbidimeter 5C. Measured by a measuring instrument 5D for the filtering basin 17 include head loss, water level, turbidity, residual chlorine concentration, pH, turbidity (sic.), flow rate, and the like. The purified water basin 20 and water distribution basin 21 are provided with instruments 5E and 5F, respectively, which measure water level, turbidity, residual chlorine concentration, pH, turbidity (sic.), flow rate, water pressure, water temperature, etc. The water distributing pipe network 24 is equipped with a measuring instrument 5G, which measures turbidity, residual chlorine concentration, pH, flow rate, water pressure, water temperature, and so on.

Input of these measurement values to a computer system 80 and the processing and storage of the former by and in the latter will next be described.

Data of the various measuring instruments described above are inputted to the computer system 80. Various data obtained by the measuring instruments 5A, 5C, 5D, 5E, 5F and 5G are sampled out at predetermined time intervals (1 minute or 1 hour). Their respective signals 5AS, 5CS, 5DS, 5ES, 5FS and 5GS are inputted at an input port 56A, and are stored in a memory 54 via a system bus 52. The memory 54 also stores various processed data which have been processed by a system processor (SP) 42. Incidentally, electrical analog signals 5BS which have been obtained from the image pickup means 5B and represent a halftone image of flocs are converted into digital signals in an image processor 40, and are then subjected to image processing. A monitor 50 outputs the results of processing by the image processor 40.

Here, the image processor 40 has the function to perform various processings which the present inventors have proposed to date (for example, Japanese Patent Application No. 82952/1986), and its outline will be described hereinafter. A halftone image obtained by the image pickup means 5B is binarized and converted into a binary image. From this binary image, the area, volume, representative diameter, configuration and the like of each floc are calculated. Calculated next are characteristic quantities such as the particle size distribution, the number of flocs, statistic representative particle sizes in the distribution, the width of the distribution (standard deviation, etc.), configurational characteristics of the flocs, the quantity of the flocs formed, the brightness of the flocs, the brightness of the background, and the density of the flocs. The overall processing may be monitored using values of the measuring instruments 5A, 5C, as needed.

Next, the construction of the computer system 80 will be described in further detail. Connected to the system bus 52 are the system processor 42, the image processor 40, the memory 54, a neural processor (NP) 70, a knowledge base 60A, a candidate knowledge base 60B, and an inference system 61. To the system processor (SP) 42, a keyboard 44 and a display 46 are connected. Input items from the keyboard 44 include (1) operation conditions for the image processor 40, (2) calculation conditions for the neural processor 70, and (3) operators knowledge on water quality information and image information. An additional keyboard may also be provided exclusively for the setting of the operation conditions (1) for the image processor 40. The system processor 42 systematically controls these conditions (1), (2) and (3), and controls the operation of the inference system 61 as needed.

A description will next be made of outputs from the computer system 80. The results of processing by the computer system 80 are transmitted via an output port 56B to the flocculant feeder pump 12A, alkali agent feeder pump 12B, stirrer 13, stirring paddles 17A, 17B, 17C, pump 19, chlorine feeder 26, pump 22, valves 23A, 23B, 23C, etc. as output control signals 12AS, 12BS, 13S, 17AS, 17BS, 17CS, 19S, 26S, 22S, 23AS, 23BS and 23CS. These signals control the operations of the corresponding devices. A control item to be performed by each device will hereinafter be described.

The injection of a flocculant is controlled by the flocculant feeder pump 12A, the injection of an alkali agent by the alkali agent feeder pump 12B, high-speed stirring by the stirrer 13, low-speed stirring by the stirring paddles 17A, 17B, 17C, back washing by the pump 19, pre-chlorination and post-chlorination by the chlorine feeder 26, distribution flow rate and pressure by the pump 22 and the valves 23A, 23B, 23C. Besides, various controls relating to the maintenance and management of the water purifying plant such as flow rate and water level control are also performed although their details are omitted herein.

The outline of a control method will hereinafter be described. The control method can be divided into (I) a conventional control method in which relationships between pieces of measurement information or between measurement information and output information (control information) are converted into a model on the basis of the measurement information and outputs are controlled based on the model and (II) a supporting method which relies upon learning of a history. The term "controls" as used herein mean automatic operations to be performed without enquiry to the operator. Further, the term "support" means an operator guidance, and primarily indicates an operation which performs a control only when an operator's approval is obtained after reference data and an operation guidance are reported using the display 46 (or a voice generator depending on the processing).

A description will next be made of the outline of procedures when the method (II) is performed. In the present embodiment, the support by the method (II) comprises the following five steps: (1) learning the history of various measurement information by the neural processor 70, (2) supporting an operation based on the results of the learning, (3) extracting knowledge and candidate knowledge from the results of the learning, (4) diagnosing the reasonability of the candidate knowledge, and (5) supporting the operation based on the knowledge and inference. Here, the term "knowledge" indicates a certain rule for the correlation between a cause and a result. Knowledge includes empirical knowledge and scientific knowledge. On the other hand, the term "candidate knowledge" indicates the combination between an event A and another event B (the event B occured when the event A was satisfied). Such a particular pair of events may occur by chance, so that it may not be considered as inevitable or empirical knowledge in many instances. It cannot therefore be recognized as knowledge. However, the pair of the events can be recognized as knowledge when they occur in combination many times. These knowledge and candidate knowledge are stored in the knowledge base 60A and the candidate knowledge base 60B, respectively.

In some instances, it is possible to use only the learning step and the supporting step.

Specific procedures of each of the control methods will next be described. A description will first be made of the control method (I), which relies upon a model phenomenologically representing the relationships between variables. This is a conventional method and, for example, using as input variables the quality of raw water measured by the instrument 5A (water temperature, turbidity, alkalinity, pH, electrical conductivity, residual chlorine concentration, chlorine demand, water quantity and water level), determines as a function of these variables the amount of a flocculant to be injected. As a model for the above determination, there is used a formula which has been ascertained through experiments or experiences. For example, regarding the turbidity, the amount of a flocculant to be injected is increased as the turbidity becomes higher. This control operation is performed without enquiry to the operator. A detailed description of this method is omitted herein because this is a conventional technology [see, for example, "SUIDOKYOKAI ZASSHI (Journal of Water Service Workers' Association)", No. 431, Page 28 (August, 1970)].

A description will next be made of details of the supporting method (II), which relies upon the learning of an operation history, and its procedures. As its prerequisite, the concept of a "support" in the present invention will be described.

The supporting method of the present invention is to give a guidance to an operator by a diagrammatic display or to automatically perform an operation in order to obtain substantially the same results as those available when the operator recalls the information on a past operation history and conducts the operation on the basis of his memory. For example, an operator is well aware of typical patterns of values of plural variables $X_i$ through experiences. Here, the term "pattern" means a group of values $Y_i$ of variables $X_i$ at a given time point. In addition, when an unusual, i.e., abnormal phenomenon occurred in connection with a certain variable $X_i$, the operator is also well aware of the phenomenon. If an unusual (abnormal) phenomenon also occurred at the same time with respect to another variable $X_j$, he estimates causes for these phenomena in various ways. Assume that the variable $X_i$ is a variable to be controlled and the other variable $X_j$ is a variable for controlling the variable $X_i$. If the operator has the experience that the variable $X_i$ was successfully controlled by an operation of the variable $X_j$ in a past abnormal time, he would probably perform the operation in view of the past experience or in a similar manner. Although he can perform the control in exactly the same manner provided that the variable $X_i$ appears in exactly the same pattern, the pattern of the variable $X_i$ fractionally differs as a matter of fact. It is therefore feasible for a man to perform the operation to give good results, but it has been difficult to realize it automatically. A man remembers a past history as experiences and therefore judges situations systematically on the basis of the experiences. The present invention is to provide a method for automatically performing such an operation. In this embodiment, the overall operation of the water purifying plant will be described.

The support according to the method (II) comprises the steps (1)–(5) as described above. In the learning step (1) designated at numeral 71, past patterns $P_{1(t1)}$, $P_2(t_2)$, . . . [$P_i(t_i)$ will be described below] of various measurement information are learned from a pattern file 71S by the neural processor 70. A method for the selection of past patterns to be learned will be described subsequently. In the supporting step (2) designated at numeral 72, the operation is supported based on the results of the learning. In the knowledge extraction step (3) shown at numeral 73, knowledge and candidate knowledge are extracted from the results of the learning. In the knowledge diagnosing step (4) illustrated at numeral 74, a diagnosis is effected to determine whether the candidate knowledge is reasonable as knowledge. In the operation supporting step (5) indicated at numeral 75, the operation is supported based on a group of knowledge obtained by the leaning and a group of knowledge inputted in advance. These processes (2)–(5) are performed by the system processor 42, and if necessary, the keyboard 44 and display 41 can be operated and the knowledge base 60A and the candidate knowledge base 60B can be accessed.

Incidentally, the term "knowledge" as used herein is a rule of the type "if . . . , then . . . ".

Contents of each of the steps will hereinafter be described in detail.

The learning step (1) 71 will now be described. Since variables dealt with as information on an operation history include all variables stored as data, they will be described first of all. The term "variables" as used herein include those inputted through the input port 56A, such as the water temperature, turbidity, alkalinity, pH, electrical conductivity, residual chlorine concentration, chlorine demand, water quantity and water level measured by the measuring instrument 5A; the floc particle size distribution, the number of locks, the statistic representative particle sizes of the distribution, the distribution width, the configurational characteristics of the flocs, the amount of the flocs formed, the brightness of the flocs and the brightness of the background calculated by the image pickup means 5B and the image processor 40; the turbidity measured by the turbidimeter 5C; the head loss, water level, turbidity, residual chlorine concentration, pH and flow rate measured by the measuring instrument 5D; the water levels, turbidities, residual chlorine concentrations, pH's, flow rates, water pressures and water temperatures measured by the measuring instruments 5E and 5F of the purified water basin 20 and the water distribution basin 21, respectively; and the turbidity, residual chlorine concentration, pH, flow rate, water pressure and water temperature measured by the measuring instrument 5G of the distributing pipe network 24. These variables will be represented by $X_i$. Further, a group of values $Y_i$ which these variables $X_i$ take at a given time point $t_1$ will be represented, as pattern 1, by $P_1(Y_1(t_1), Y_{2(t2)}, \ldots Y_n(t_n))$. This may be abbreviated as $P_1(t_1)$. Patterns $P_{1(t1)}$, $P_2(t_2)$, . . . at different time points are learned. To make a generalized description, these variables are all inputted and learned in this embodiment. Needless to say, these variables can be selectively used in accordance with the objective.

Values of these variables are processed (learned) at the neural processor 70. This processing will be described with reference to FIG. 3.

Figure 3:
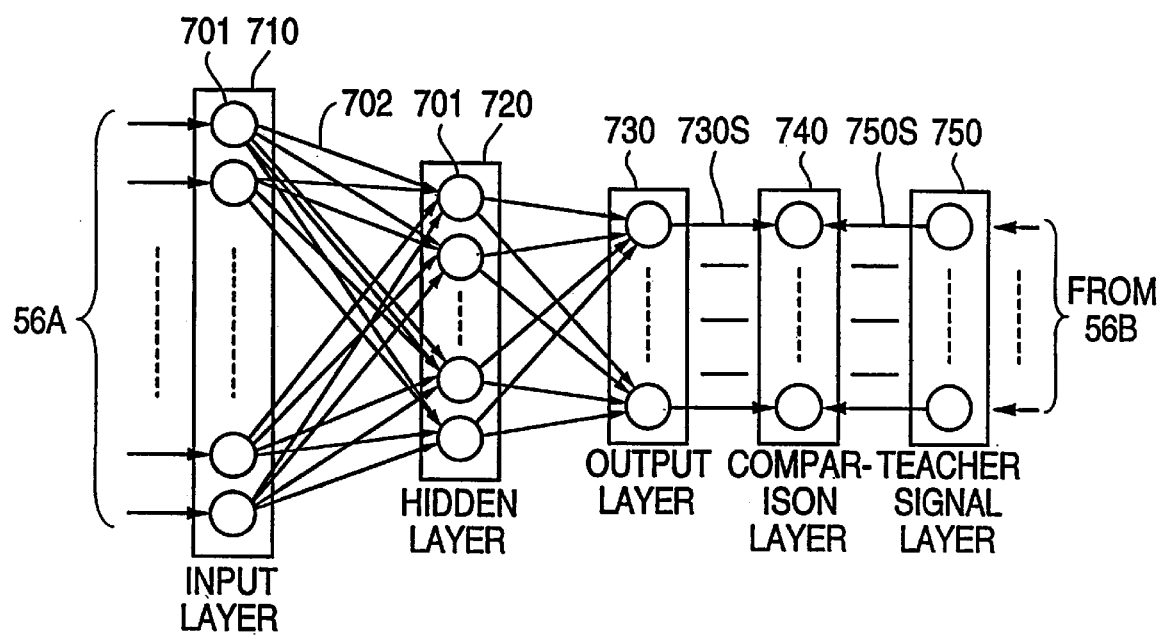
FIG. 3 is a schematic diagram of a neural network.
Figure 6:
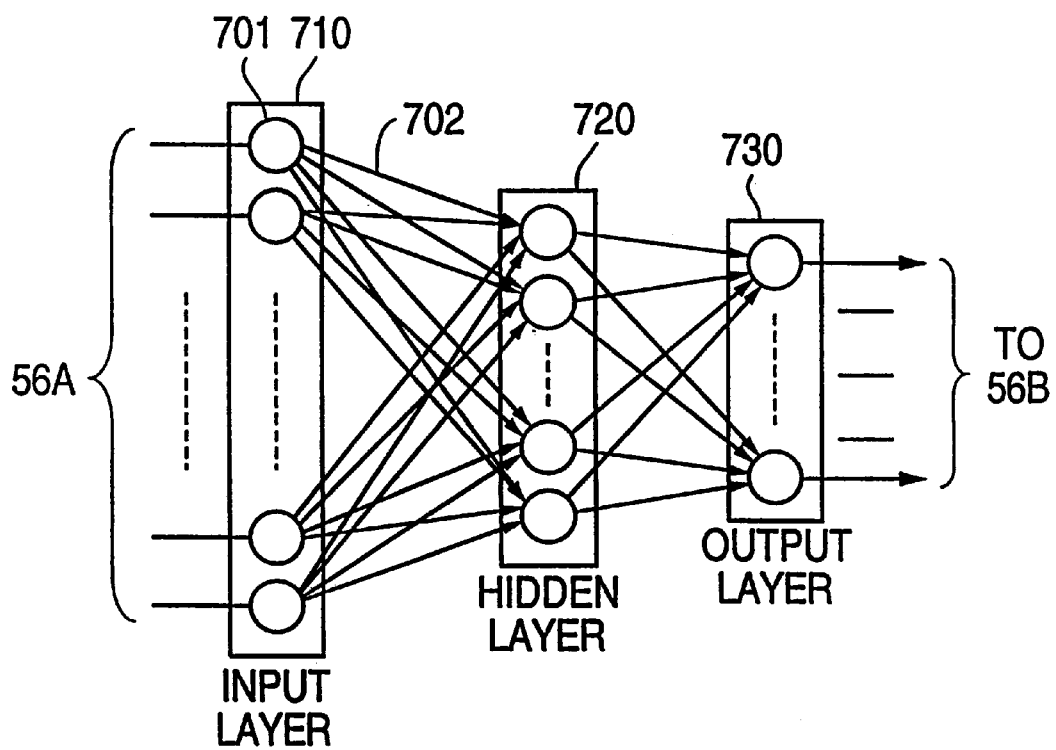
FIG. 6 is a schematic diagram of a neural network useful for 'perception'.

Marks will be described firstly. In FIG. 3, each mark "O" indicates a neuron element model 701. A solid line 702 connecting one "O" to another "O" indicates the existence of transmission of information between the associated neuron element models 701. Further, the neural processor 70 comprises an input layer 710, a hidden layer 720 and an output layer 730. Here, each layer is constructed of a limited number of neuron element models, while the neuron element models in the respective adjacent layers are connected one another. Although the hidden layer 720 can include plural layers, an example having only one hidden layer is shown by way of example in the present embodiment for the sake of simplification. FIG. 3 illustrates the construction at the time of learning while FIG. 6 shows the construction at the time of use after the learning. These constructions will be called neural networks (neural circuit models or neural circuit networks).

A description is now made of the setting of the variables for the input layer 710 and the output layer 730. Variables to represent causes are assigned to the input layer 710, while control variables to be determined based on these causes (i.e., variables to be controlled) are assigned to the output layers 730. In other words, as variables for the output layer 730, control variables are set in the present embodiment.

The neural network will be described more specifically. Firstly, the above-described pattern $P_i(t_i)$ is inputted from the pattern file 71S to the individual neuron element models of the input layer 710. It is desirable to adjust the scale of the pattern so that the values of the pattern are "0" or greater at the minimum but are not greater than "1" at the maximum. On the other hand, signals outputted from the output port 56B are assigned to the individual neuron element models of the output layer 730 and also to a teacher signal layer 750. Namely, these signals include the signal 12AS for the control of the flocculant feeder pump 12A, the signals 12BS for the control of the alkali agent feeder pump 12B, the signals 13S for the control of the stirrer 13, the signals 17AS, 17BS, 17CS for the control of the stirring paddles 17A, 17B, 17C, the signal 19S for the control of the pump 19, the signal 26S for the control of the chlorine feeder 26, the signal 22S for the control of the pump 22, and the signals 23AS, 23BS, 23CS for the control of the valves 23A, 23B, 23C. A target pattern composed of the values of these signals is represented by $C(P_i(t_i))$.

Figure 4:
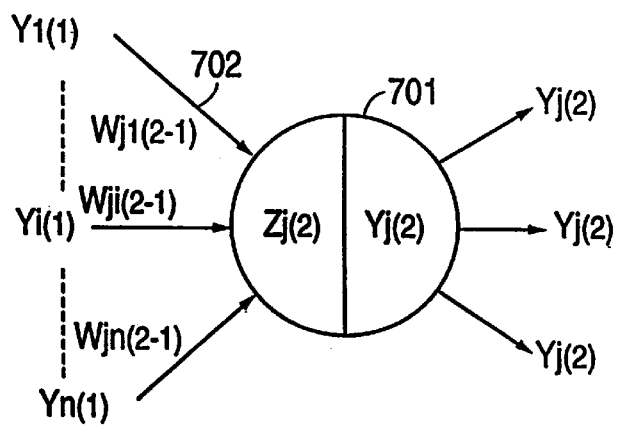
FIG. 4 is a schematic diagram of a neuron element model.

Here, the basic operation of the neuron element model 701 will be described with reference to FIG. 4, in which inputting of n variables ($X_1$–$X_n$) is illustrated by way of example. Values of the signals for the variables $X_1$–$X_n$ at a given time point $t_1$ are expressed by $Y_1(t_1)$–$Y_n(t_n)$.

A setting method at the time point $t_1$ will be described firstly. Assume that the pattern at the time point $t_1$ is $P_1(t_1)$. For some patterns, this time point $t_1$ is selected by the operator. For other patterns, it is selected automatically. The former patterns include the typical pattern $P_1(t_1)$, and patterns at abnormal times which the operator want to refer to subsequently. They are stored in the pattern file $P_f(t_i)$. This selection is important because the neural network will eventually function on the basis of these learned contents. The selection is assigned to the operator with a view to relying upon the systematic data judgment ability which the operator has obtained through experiences. In this case, the patterns to be learned are plural patterns $P_1(t_1)$, $P_2(t_2)$, . . . at different time points, and the neural network is cause to learn these plural patterns repeatedly. As a result, it is possible to have the neural network equipped with a pattern recognition ability comparable with that of an operator having the past experiences. Teaching by the operator is conducted by man-machine conversation via the keyboard 44 and the display 46.

On the other hand, automatic selection requires an advance statistical analysis of a data stream. Namely, a pattern which occurs most frequently is determined by a statistical analysis. Regarding this pattern as a pattern for a steady state, the neural network is caused to learn it. Another pattern which occurs least frequently is then considered as a pattern for an abnormal state, and the neural network is also caused to learn the pattern.

As a specific method for the selection of patterns, the following method is also effective.

(1) When the treatment has been succeeded (for example, the turbidity of the settling basin is 1 mg/M or lower): The neural circuit model is caused to learn the conditions for this operation either automatically or after enquiry to the operator. (2) When the treatment has resulted in a failure: The neural circuit model is not caused to learn the condition for this operation.

By repeating these operations (1) and (2), the neural circuit model can selectively learn the conditions for successful operations only. This has the advantage that the neural circuit model becomes wiser as the learned contents increase.

Namely, there is the advantage that the perception error (to be described below) will be reduced gradually and the accuracy will be improved correspondingly.

A method for causing the neural circuit model to learn given patterns will be described over a some length of pages hereinafter.

Further, although will be described in detail, the objects of the present invention can be attained more effectively, for example, by simultaneously inputting patterns $P_1(t_1)$, $P_2(t_2)$, . . . of variables at such different time points to the input layer, also inputting the time-dependent differences $P_i(t_i)$–$P_j(t_j)$ of the variables, and causing different neural networks to learn patterns for steady state operations and patterns for non-steady state operations, respectively.

A description will hereinafter be made of certain basic calculation methods at the neural network. Firstly, an operation in which signal values $Y_1$–$Y_n$ are multiplied by the corresponding weight factors $W_{ji}$ and the resulting products are then summed (multiplication and summing operation) is expressed by the following formula:

$$Z_j(2) = \sum_{i=1}^{n} Wji(2 \leftarrow 1) \cdot Yi(1) \qquad <1>$$

where $Y_i(1)$: a value of $X_i$ of the input layer (first layer), $W_{ji}(2\leftarrow 1)$: a weight factor for the route from the $i^{th}$ variable in the input layer (first layer) to the $j^{th}$ neuron element model in the hidden layer (second layer), and $Z_{j(2)}$: the sum of inputs to the $j^{th}$ neuron element model in the hidden layer (second Layer).

At the neuron element model 701, an output value therefrom is calculated depending on the magnitude of $Z_{j(2)}$, namely, in accordance with the following formula:

$$Y_{j(2)} = 1/(1-e^{-Z_{j(2)}}) \qquad <2>$$

Figure 5:
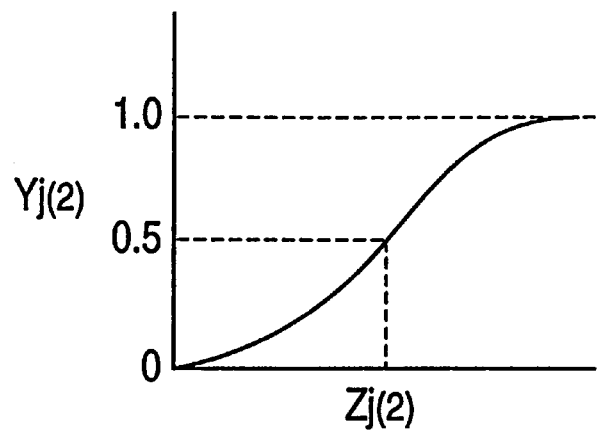
FIG. 5 is a diagrammatical illustration of conversion of a signal by the neuron element model.

Details of the calculation by the formula 2 have such a relationship as shown in FIG. 5. Namely, as illustrated by the graph of the same drawing, a value ranging from "0" to "1" is obtained as $Y_{j(2)}$ corresponding to the value of $Z_{j(2)}$. The calculated value $Y_{j(2)}$ is delivered further to the output layer, where a similar calculations are executed. The outline of the manner of calculation in the neural network will now be described. The above-described value $Y_{i(1)}$ of each variable $X_i$ is inputted to the input layer shown in FIG. 3. This signal (value) is outputted to the neuron element models of the hidden layer. At the neuron element models of the hidden layer, the sum $Z_{j(2)}$ of products of these output values $Y_{i(1)}$ and weight factor $Wij(2\leftarrow 1)$ is calculated in accordance with the formula 1. Based on the magnitude of the calculation result, the output value $Y_{j(2)}$ to the output layer is determined in accordance with the formula 2. Similarly, the sum $Z_{j(3)}$ of products of the output values $Y_{j(2)}$ from the hidden layer and weight factors $Wij(3\leftarrow 2)$ between the hidden layer (second layer) and the output layer (third layer) is calculated in accordance with the following formula:

$$Zj(3) = \sum_{i=1}^{n} Wji(3 \leftarrow 2) \cdot Yi(2) \qquad (3)$$

where $Y_{i(2)}$: a value of the hidden layer (second layer), $Wji(3\leftarrow 2)$: a weight factor for the route from the $i^{th}$ variable in the hidden layer (second layer) to the $j^{th}$ neuron element model in the output layer (third layer), and $Z_{j(3)}$: the sum of inputs to the $j^{th}$ neuron element model in the output layer (third layer).

Further, depending on the magnitude of $Z_{j(3)}$, the output value $Y_{j(3)}$ to the output layer 730 is calculated in accordance with the following formula:

$$Y_{j(3)} = 1/(1-e^{-Z_{j(3)}}) \qquad <4>$$

In the manner described above, the value $Y_{j(3)}$ calculated by the output layer is obtained.

To perform learning by the neural network, a comparison layer 740 and the teacher signal layer 750 are also provided after the output layer 730 as shown in FIG. 3, whereby the signals 730S from the output layer 730 and teacher signals 750S from the teacher signal layer 750 are inputted to the comparison layer 740 and are compared to each other there. The magnitudes of the weight factors $Wji(3\leftarrow 2)$ and the weight factors $Wji(2\leftarrow 1)$ are adjusted to reduce the errors. When the calculations by the formula <1>–<4> and the comparison with the teacher signals are conducted again by using the weight factors thus adjusted, errors are obtained similarly. The magnitudes of the weight factors Wji(3←2) and Wji(2←1) are adjusted again to reduce the errors. The weight factors Wji are repeatedly adjusted as described above until the errors are reduced sufficiently. The errors are obviously large at the beginning because the weight factors are set at random (i.e., occur as random numbers). The values of the output signals gradually approach the values of the corresponding teacher signals. Accordingly, the distribution of the weight factors Wji reflects how the variables $X_j$ of the output layer 730 have been determined from the variables $X_i$ of the input layer 710.

The correction method of errors in the manner as described above is called the "reverse error propagation method". The known technique devised by Rumelhart et al. is employed. For details, reference may be had to the publication, "Rumelhart: Parallel Distributed Processing, Vol. 1, MIT Press (1986)"

Such learning per se is known. However, the particular feature of the present invention resides in that a neural network is caused to repeatedly learn plural patterns of a group of variables at different time points to have the neuron circuit model equipped with ability comparable with the past experiences of an operator. The plural patterns are patterns $P_r(t_r)$ which were judged important by the operator in the past. In this manner, pattern recognition ability comparable with the past experiences of the operator is reflected to the distribution of the weight factors $W_{ji}$ of the neural network, accumulated and stored.

In the embodiment described above, the calculations were performed by way of example at the neural processor 70. They can also be executed at the system processor 42. In either case, the system must have the function of the neural processor 70 described above because the present invention applies a neural network for supporting an operation.

A description will next be made of the supporting step 72 shown in FIG. 2. In this step, the operation is supported based on the results of the learning in the learning step 71. As has been described above, the past experiences are reflected to the distribution of the values of the weight factors $W_{ji}$ in the neural network. By inputting to the input layer a pattern $P_r(t_r)$ consisting of values $Y_i(t_r)$ of the variables $X_i$ at the present time point t, values of the control variables $X_j$ set as outputs are therefore calculated as a result.

This calculation is performed by using the neural network composed of the input layer 710, the hidden layer 720 and the output layer 730 as shown in FIG. 6 which is a portion of FIG. 3.

According to this calculation, the formulae <1>–<4> are calculated using the pattern $P_r(t_r)$ at the present time point. This calculation will be called "perception".

The results of the perception are shown on the display 46 to support the operation. Namely, the operator can operate with reference to the results thus displayed. To perform the support automatically, the respective control signals 56BS are set to give a target pattern $C(P_r(t))$ which corresponds to the results of perception at the time of the pattern $P_r(t)$. Since values to be calculated by perception are dependent on patterns learned, patterns to be learned must be typical patterns at different time points or patterns at abnormal time points to be noted, as described above.

The knowledge extraction step 73 will now be described. In this knowledge extraction step 73, knowledge and candidate knowledge are extracted from the results of the learning. The extraction method is performed in three stages. An extraction method attracted to the weight factors will be described firstly. In the relationships between the variables $X_i$ assigned to the input layer 710 and the variables $Y_j$ assigned to the output layer 730, the variables $X_i$ can be considered as causes while the variables $Y_j$ can be regarded as results. The number of variables $X_i$ affecting the variables $X_j$ is therefore limited in the calculation of the perception for deriving the variables $X_j$ from the variables $X_i$. Because the degree of influence is governed by the weight factors $W_{ij}$, the greater the absolute values of the weight factors $W_{ij}$, the greater the degree of the influence. However, the perception of the variables $X_j$ from the variables $X_i$ requires the execution of the calculation formulae <1>–<4> by the neural network constructed of plural layers while using Wji(←1) and Wji(3←2). It is therefore difficult to ascertain which weight factor or factors are predominant. Therefore, as an index systematically evaluating the relationships between the variables $X_i$ (causes) and the variables $Y_j$ (results), an "causality index" $I_{ji}$ defined by the following formula is employed.

$$Iji = \sum_{k=1}^{m} |Wji(3 \leftarrow 2) \cdot Wki(2 \leftarrow 1)| \qquad <5>$$

where m is the number of neuron element models in the hidden layer. Since the above formula calculates the sum of products of all weight factors through every route from $X_i$ to $X_j$, it indicates the degree of influence from the variable $X_i$ to the variable $X_j$. In the knowledge extraction step 73, the calculation by the formula <5> is conducted first of all. If the causality index $I_{ji}$ takes a large value, there is a high chance of existence of a causal relationship between the variable $X_i$ and the variable $X_j$. Thus, this relationship is registered as knowledge or candidate knowledge in the knowledge base 60A or candidate knowledge base 60B in the knowledge diagnosis step 74 to be described subsequently. Representing a reference value for judgment by I* and the sign of Wjk(3←2)• KWki(2←1) by Q, it is considered, as will be shown by the following equation, that a positive causal relationship exists when Q is positive but a negative causal relationship exists when Q is negative on the contrary. For example,

[Knowledge 1] When $I_{ji}$>I* and Q>0, the variable $X_j$ increases with the variable $X_i$     <6>

[Knowledge 2] When $I_{ji}$>I* and Q<0, the variable $X_j$ decreases with the variable $X_i$     <7>

Incidentally, when $I_{ji} \leq I^*$, it is deemed that no causal relationship exists between the variable $X_i$ and the variable $X_j$. Further, although a detailed description is omitted, a more careful and precise counter-measure is feasible if the magnitude of the value of $I_{ji}$ is used as a membership function for the fuzzy inference instead of making the judgment only by the comparison with the judgment reference value I*. In other words, the causality index can be used in a method for automatically obtaining a membership function.

Details of the diagnosis (enquiry) will herein~after be described specifically.
(a) Enquiry about causality index:
(a1) If $I_{ji}$>I*,
Make an enquiry to the operator about the relationship between $X_i$ and $X_j$ (for example, the relationship between <6> or <7>). If a causal relationship is found to exist, register it in the knowledge base 60A. If no causal relationship is found to exist, register it in the candidate knowledge base 60B.

(a2) If $I_{ji} < I^*$,
  Register the relationship between $X_i$ and $X_j$ in the candidate knowledge base 60B without enquiry to the operator, or in some instances, abandon it.

When $I_{ji} < I^*$, elimination of the line 702 connecting the variables $X_i$ and $X_j$ to each other can simplify the network structure. This brings about the advantageous effect that the calculation speed is improved. It may also be contemplated of changing the number of hidden layers itself. Such a modification of the construction may preferably be conducted after learning a limited number of times.

It is also possible to automatically conduct these operations without making enquiries to the operator on the basis of the respective judgments. In this case, the operations can be performed in the following manner.

(a) Enquiry about causality index:
  (a1) If $I_{ji} > I^*$,
    Register the relationship between $X_i$ and $X_j$ in the knowledge base 60A.
  (a2) If $I_{ji} < I^*$,
    Register the relationship between $X_i$ and $X_j$ in the candidate knowledge base 60B.

Knowledge and candidate knowledge are classified as described above. There is however the possibility that even when classified as candidate knowledge, the candidate knowledge may actually be knowledge which the operator has not notice. If a phenomenon associated with particular candidate knowledge registered in the candidate knowledge base 60B occurs plural times, make an enquiry again to the operator to diagnose whether the particular candidate is reasonable as knowledge or not.

In the operation supporting step 75, the operation is supported by using a group of knowledge inputted beforehand in the knowledge base 60A. Namely, knowledge already ascertained (empirical, scientific knowledge or the like) is stored in advance in the knowledge base 60A. A wide variety of knowledge is therefore progressively stored in the knowledge base 60A. The inference system 61 is driven based on the knowledge to derive a conclusion, which is then shown on the display 46. The data of the memory 54 are also used as needed. As an inference method, a conventional technique such as forward inference or backward inference can be applied. Using the result, outputted are the signals 56B which determine the target pattern $C(P_i(t_i))$.

In the manner described above, the present invention causes a neural network to learn the history of operations at different time points in the past as needed, so that operations similar to those conducted in the past can be supported. Further, the acquisition of knowledge can be effected either through interaction with an operator or automatically. This method makes it possible not only to perform a similar operation to an operation in the past but also to increase the knowledge with time. Similarly to the operator, the neural network can also learn actual results and acquire experiences, whereby the neural network has the function in which it can become wiser.

Another embodiment will next be described with reference to FIG. 7. This embodiment has a similar construction to the above-described embodiment of FIG. 2 except for the following three features (a), (b) and (c):

(a) Patterns $P_1(t_1)$ and $P_2(t_2)$ at different time points are used at the same time as the pattern to be inputted to the input layer.

(b) The difference between the patterns, $P_{1,2}(t_{1,2}) = P_{1(t1)} - P_2(t2)$, is employed.

(c) Plural neural networks are provided independently for respective functions to cause them to learn different patterns (for example, a pattern in a steady state and another pattern in a non-steady state).

Figure 7:
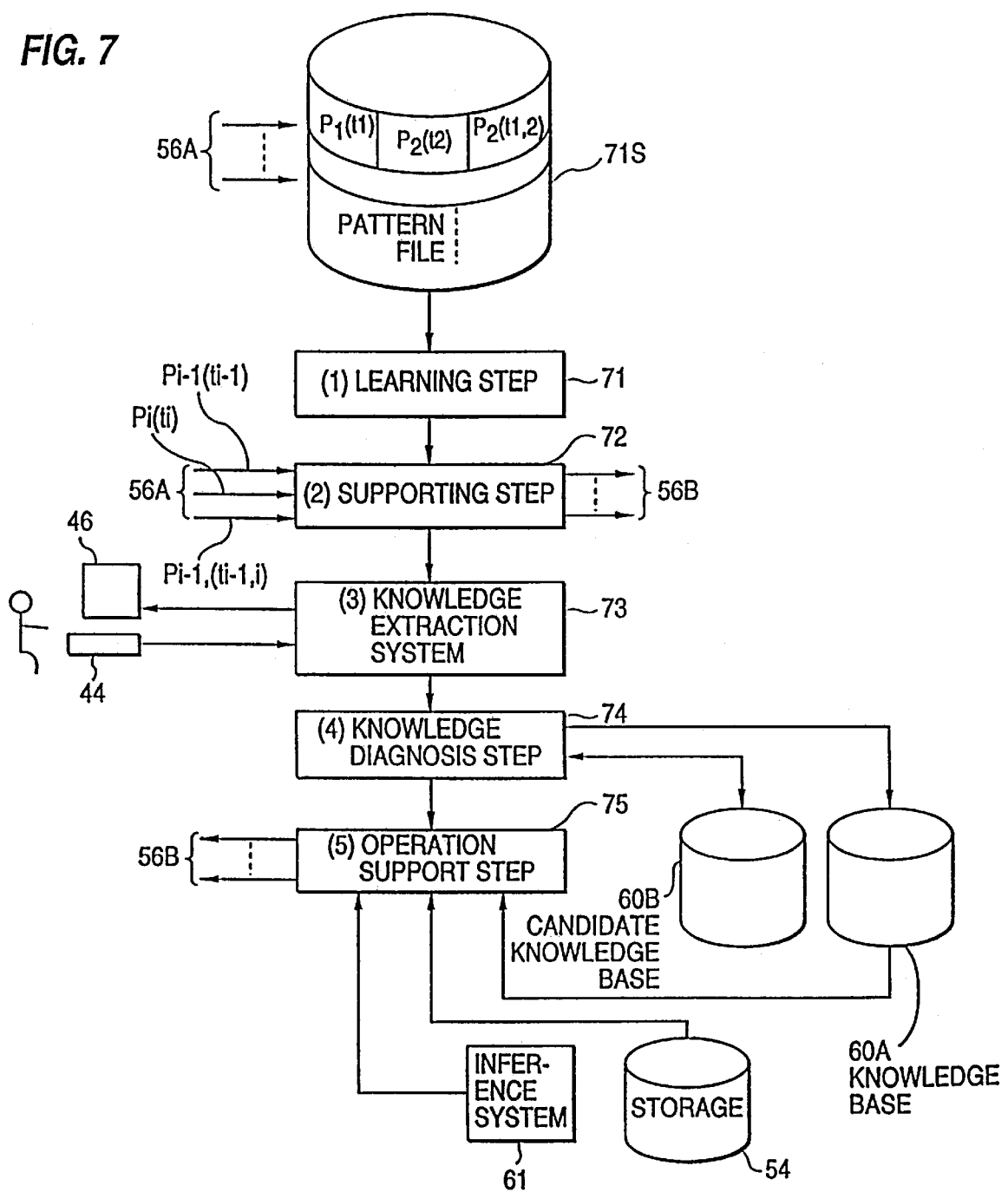
FIG. 7 is a flow diagram of another embodiment of the present invention.

A single new pattern composed of $P_{1(t1)}$, $P_{2(t2)\ and\ P1,2(t1,2)}$ is stored in the pattern file 71S as illustrated in FIG. 7. This new pattern is learned in the learning step 71. Here, a different value is set as the time interval $\tau$ $(=t_1-t_2)$ between time $t_1$ and time $t_2$ depending on the time-dependent variation characteristics and control characteristics of a process whose operation is to be supported. The manner of learning is as described above with reference to FIG. 2.

In the supporting step 72, the operation is supported based on the results of the learning. In this step, a perceptive calculation is executed upon receipt of a pattern $P_i(t_i)$ at a present time, another pattern $P_{i-1}(t_{i-1})$ at a time point time $\tau$ before the present time, and the difference $P_{i-1,i}(t_{i-1,i})$ between both the patterns. The calculation method is as described above with reference to FIG. 2.

Operations in the knowledge extraction step 73, knowledge diagnosis step 74 and operation supporting step 75 are as described above with reference to FIG. 2.

Figure 2:
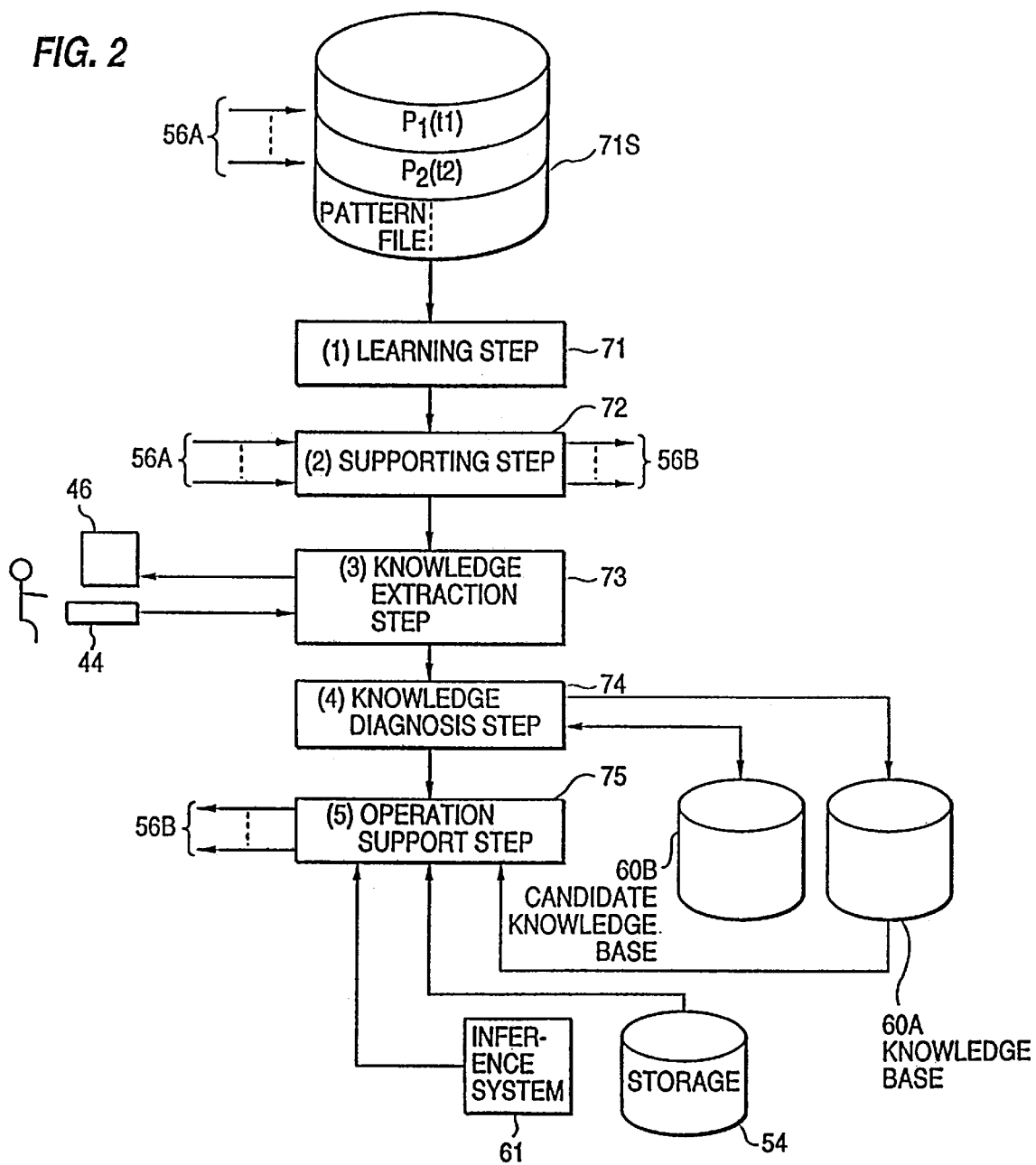
FIG. 2 is a flow diagram of specific procedures in the embodiment.

The embodiment of FIGS. 1 and 2 has the advantage that a history over a long period of time is learned. The embodiment described with reference to FIG. 7 however has the two advantages that (a) learning of a phenomenon which varies in a short period of time (on the order of time $\tau$) can be performed effectively and (b) the intention of an operator can be effectively reflected by using neural networks which have learned respective patterns classified in accordance with their functions. Namely, the advantage (a) is particularly effective when the control variable $X_j$ is controlled in different manners depending upon whether the value $Y_i(t)$ of the variable $X_i$ is increasing or decreasing. For example, the advantage (a) is effective in performing control at the time of a start-up or stop of a plant or in supporting control at a non-normal time or an abnormal time. On the other hand, the advantage (b) is effective especially when the manner of operation of a plant differs depending on the situation (the pattern of the variable $X_i$). Usually an operation at a normal time and an operation at a non-normal time are conducted in accordance with different guidelines and manners. In such a case, it is effective to independently provide a neural network for a normal time and another neural network for a non-normal time and to use them selectively depending on the situation.

As has been described above, the present embodiment learns the history of past operations which are different from one another in situation, thereby making it possible to support operations similar to such past operations. Further, upon acquisition of knowledge, it is also possible to acquire one or more causal relationships which vary in a short time period. This makes it possible to provide a support such that an operator can perform an operation of a plant more precisely.

The present invention has heretofore been described in a general term, taking its application to a water purifying plant by way of example. Details of specific support and control will be described by the following specific examples.

A support and control system for an operation of a flocculation and settling process can be obtained provided that, as input items, the measurement items of the instrument 5A, i.e., water temperature, turbidity, alkalinity, pH, electrical conductivity, residual chlorine concentration, chlorine demand, water quantity and water level, the measurement items of the image pickup means 5B and image processor 40, i.e., characteristic quantities of flocs and the turbidity measured by the turbidimeter 5C are inputted to the input layer, and also provided that the flocculant feed pump control signal 12AS, alkali agent feed pump 12BS, stirrer control signals 13S, and stirring paddle control singals 17AS, 17BS, 17CS are set as teacher signals. This system can perform of support/control for a flocculant feeding operation, support/control for an alkali agent feeding operation, support/control for a high-speed stirring operation, support/control for a low-speed stirring operation, and so on. Further, the image pick-up means 5B can be provided in the high-speed mixing basin 10, settling basin 16 or filtering basin 17 to use the processing results of an image therefrom.

Here, a description is made of a specific example, in which the present invention is applied to the feeding of a flocculant to a water purifying plant, and its effects.

Figure 8:
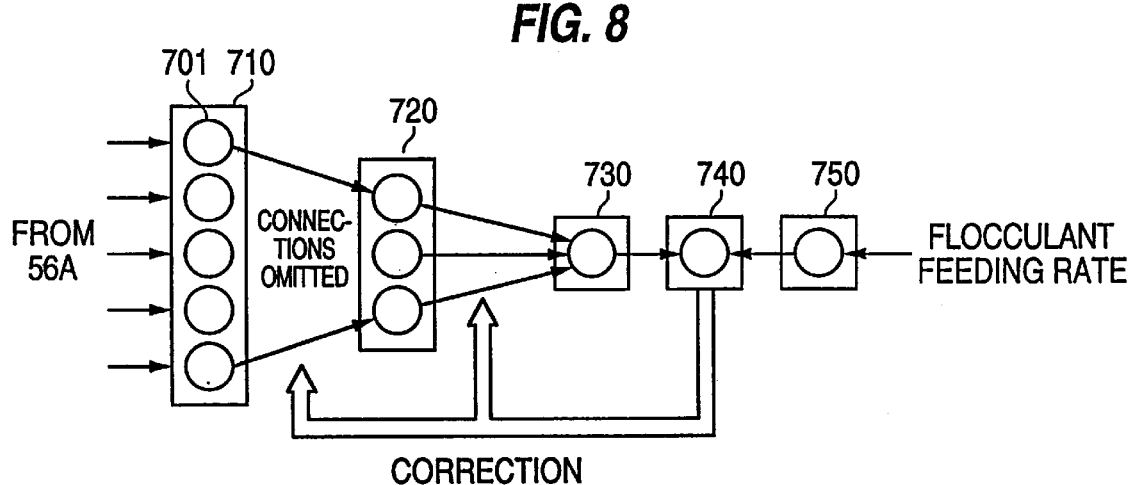
FIG. 8 through FIG. 10 are schematic diagrams of neural networks constructed to apply the present invention to the injection of a flocculant.

The construction of a neural circuit model in this example is shown in FIG. 8 which corresponds to FIG. 3. The input layer 710 in this neural circuit model contains five neuron element models 701, to which the temperature, turbidity, alkalinity, pH and flow rate of raw water at typical times on representative days are inputted. Further, the hidden layer 720 is constructed of three neuron element models while the output layer 730 and teacher layer 730 are each constructed of one neuron element model which is assigned to a flocculant feeding rate. In a learning step, the qualities of raw water on pre-selected days (the time should be set at a particular time beforehand) are inputted to cause the neural circuit model to learn it. This learning step corresponds to the learning step 71 described with reference to FIG. 2. In learning, days to be referred to for the purpose of supporting the operation are selected at first. It is important to cause the neural circuit model to learn days on which the treatment was successfuly, because leaning of a day on which the treatment failed results in wrong learning. Next, selection of a day on which learning should be effected is also important. In particular, variations in water quality and variations in season give significant influence to the ability of treatment at a water purifying plant. Such typical days (treatment conditions) as representing year-around variations thoroughly are therefore chosen. For example, one day is chosen per month as a pattern to be learned. A standard for this selection is as follows:

(1) Where good treatment results are obtained, for example, in the example of the water purifying plant, choose at least one day on which the turbidity of the setting basin is 1.0 mg/M or less.

(2) Choose at least one typical day where the water quality varies throughout the year, namely, choose at least one typical day in each of spring, summer, autumn and winter in the example of the water purifying plant.

In the present example, as days on which the treatment was successful (i.e., the turbidity of the setting basin was below the prescribed value), the water qualities on ten days (one condition per day) are inputted out of the operation history within 1 year (365 days) while hand, the neural circuit model is caused to learn the corresponding flocculant feeding rates as teacher signals. Five to thirty days are suitable as the number of days to be learned.

Figure 9:
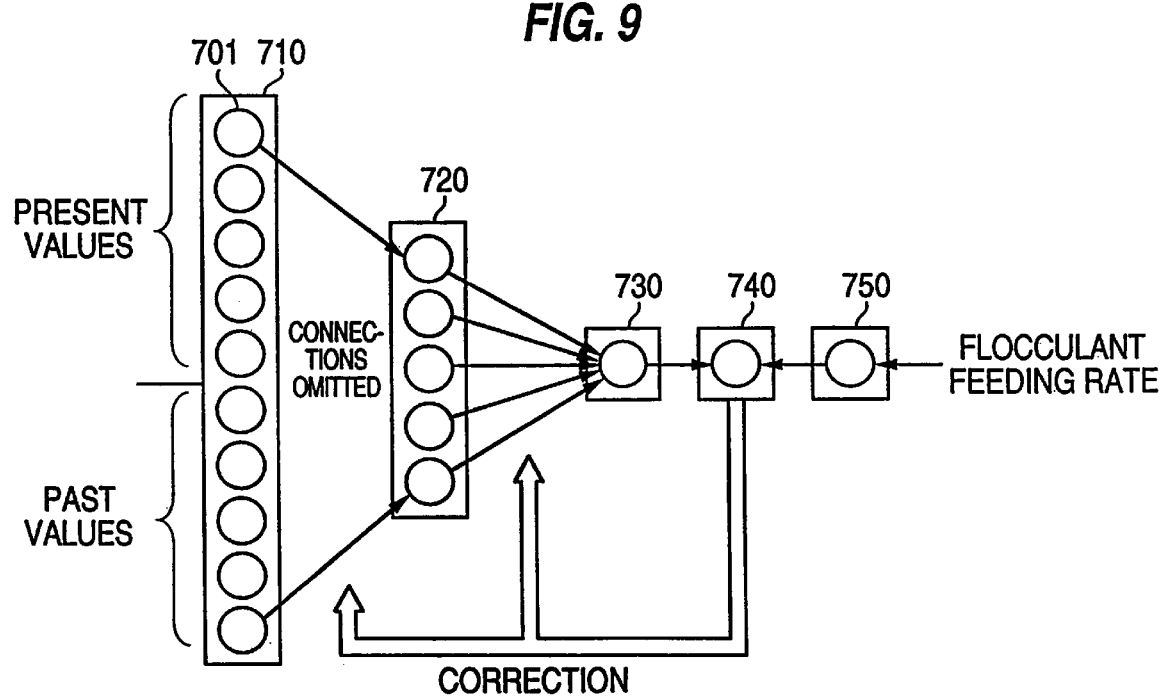

After the learning was completed, unlearned conditions (on the 355 days) were inputted to the learned neural circuit model of FIG. 8 to cause the neural circuit model to perceive the corresponding flocculant feeding rates. Perception was conducted by a construction similar to that of FIG. 8 except for the elimination of the comparison layer 740 and the teacher signal layer 750, in other words, by a construction equivalent to that of FIG. 6. As a result, the perception error (which is defined by an average of the differences between perceived values and the corresponding values actually measured) was about 20%. Although this perception error is equivalent to about 3 mg/M when converted into a flocculant feeding rate, this system is practically usable for supporting the operation of the water purifying plant. According to this specific example, the learning of only the small number of days out of the days in the whole year permitted perception of flocculant feeding rates for days of various water qualities over the long time period. Reference is next had to FIG. 9, in which illustrated is an exemplary neural circuit model construction for the case where not only the typical water quality at a certain time point in a day but also the water quality or qualities at one or more other time points are simultaneously used as inputs to the neural network. This construction is equivalent to the construction of FIG. 7 except that the difference pattern is not used among the input patterns. Although the "other time points" may be one time point or plural time points, this example will be described taking a case in which one other time point will be considered. Namely, to the input layer 710, the values of the water temperature, turbidity, alkalinity, pH and flow rate of the raw water at a present time and those in the past (at a time point a predetermined time interval before the present time) are inputted. The input layer 710 therefore requires 10 neuron element models. Five neuron element models are used for the hidden layer 720. Further, one neuron element model is employed for each of the output layer 730 and the teacher signal layer 750 to which a flocculant feeding rate is assigned in a similar manner to FIG. 8. The present water quality to be inputted to the input layer corresponds to P1(t1), while the past water quality also to be inputted to the input layer corresponds to P2(t2.). As these past values, the information on the water quality five hours before is used in this example. Accordingly, in this example, in view of both the water quality at the time point of each learning and the water quality five hours before, it is learned how the flocculant feeding rate should be set for the former time point. The time point in the past is not necessarily limited to five hours before, and the time point one hour before or twelve hours before may be employed. The neural network was caused to learn the water qualities on ten days and the corresponding flocculant feeding rates. As a result, the perceptive error was 17%. The error was improved over the example of FIG. 8 because time-dependent variations of the water quality were taken into consideration in the input layer.

Figure 10:
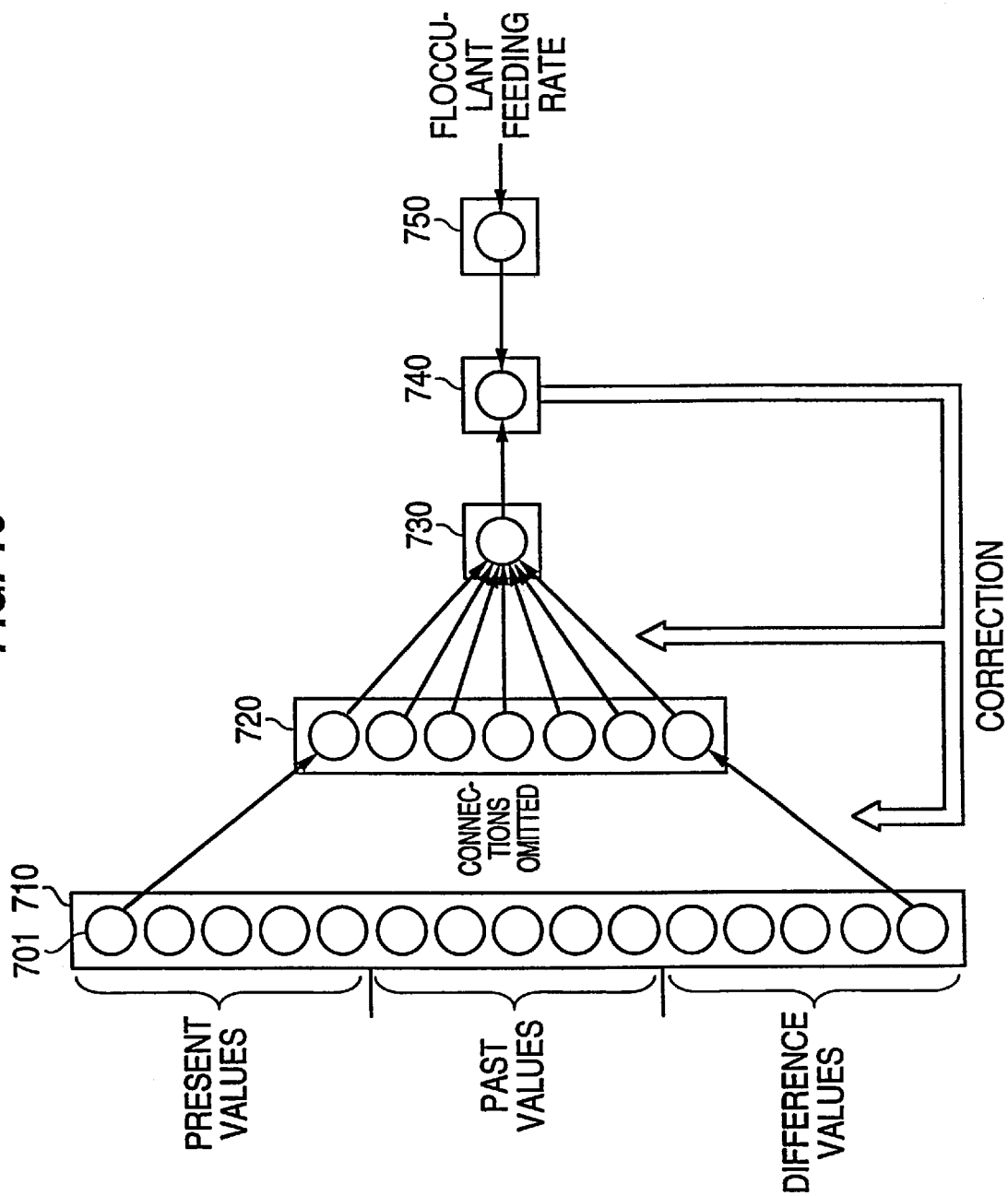

The neural network of FIG. 10 shows further use of information on time-dependent differences as input information. This neural network corresponds to that described with reference to FIG. 7. In this example, time-dependent variations of the water quality are explicitly inputted as differences. Namely, inputted simultaneously to the input layer 710 are (1) present values of the water temperature, turbidity, alkalinity, pH and flow rate of the raw water , (2) their past values, and (3) the differences between the present values and the corresponding past values. Correlating these inputs to the inputs in FIG. 7, P1(t1) corresponds to the present water quality, P2(t2) to the past water quality, and P1,2(t1,2)=P1(t1)−P2(t2.) to the differences therebetween. In this example, fifteen neuron element models are used in the input layer 710, and seven neuron element models in the hidden layer 720. Using one neuron element model in each of the output layer 730 and the teacher signal layer 750 as in the aforementioned example, the flocculant feeding rate is assigned thereto. As a result of learning in a similar manner as in the preceding example, the perceptive error in one year was improved up to 12%. Namely, as a result of explicit use of time-dependent variations of the water quality in the form of values of differences as input information in this example, it has become possible to more accurately predict the injection rate when the water quality varies significantly, for example, at the beginning or end of rain fall.

The accuracy can be improved further provided that floccurant feeding rates in the past are added as past values.

Although not illustrated in the drawing, two neural networks of the same type as the neural networks of FIG. 10 were provided independently, one for fine weather as a normal time (raw water turbidity: 10 mg/l or lower) and the other for rainy weather as a non-normal time (raw water turbidity: 10 mg/l or higher). They were caused to learn independently, followed by perception in a similar manner to the examples described above. As a result, the perceptive error was improved up to 7%. This means that the manner of operation by a well-experienced operator was reproduced more faithfully owing to the consideration of both rainy time and fine time or both the beginning and ending of rain fall. As is envisaged from the foregoing, the additional consideration of time-dependent difference information and the independent use of plural neural networks for different functions can bring about the advantageous effect that the perceptive error (i.e., the guidance error in supporting an operation) can be reduced further.

Next, the previously-described conventional method, in which the relationship between measured information (the quality of raw water) and output information (the feeding rate of a flocculant) are converted into a model, will be compared specifically in effects with the present example. As a conventional method, a general multiple regression analysis was employed. According to this method, the year-around data on the quality of raw water and flocculant feeding rate are all used to represent the relationship between the quality of raw water and the corresponding feeding rate of flocculant by means of a formula. The error of the flocculant feeding rate over one year was calculated by this method. The calculation gave an error of about 14%. In the present embodiment of the invention, although the data of only 20 days in total were employed in this example, according to the specific examples of FIG. 10 et seq, there examples have been found to be at least as effective as the conventional method which uses the data of one year.

Although not described in this embodiment, input of information available from monitoring of images such as the state of floc formation can bring about one or more advantages additionally. Further, although a detailed description is omitted, the combination of input patters is not limited to those described above and may include the combination of present values and differences or the combination of past values and differences.

As other application examples of the present invention in the form of the system of FIG. 1, a support and control system for a feeding operation of chlorine can be obtained provided that, as input items, the measurement items of the instrument 5A, i.e., water temperature, turbidity, alkalinity, pH, electrical conductivity, residual chlorine concentration, chlorine demand, water quantity and water level, the measurement items of the image pickup means 5B and image processor 40, i.e., characteristic quantities of flocs, the turbidity measured by the turbidimeter 5C, the measurement items of the instrument 5D, i.e., head loss, water level, turbidity, residual chlorine concentration, pH and flow rate, and the measurement items of the instruments 5E and 5F, i.e., water levels, turbidities, residual chlorine concentrations, pH's, flow rates, water pressures and water temperatures are inputted to the input layer, and also provided that the chlorine feeder control signal 26S is set as a teacher signal. On the other hand, setting of the pump control signal 19S as a teacher signal results in a support and control system for a filtration process.

Further, a support and control system for the control of the water quality and quantity in a distributing pipe network can be obtained provided that the measurement items of the instruments 5E, 5F, i.e., water levels, turbidities, residual chlorine concentrations, pH's, turbidities, flow rates, water pressures and water temperatures and the measurement items of the instrument 5G, i.e., turbidity, residual chlorine concentration, pH, flow rate, water pressure and water temperature are inputted to the input layer, and also provided that the pump control signal 22S and the valve control signals 23AS, 23BS, 23CS are set as teacher signals. This system can be employed to support and control the operation in connection with the distribution flow rate and water pressure.

In each of the foregoing examples, the operation is conducted in accordance with the past history and/or operation results. Advantageously, they all have the functions that an operation can be performed in the light of the actual results and the precedence, knowledge can be acquired automatically and the quality of support and control is progressively improved, although such functions have been hardly realized by conventional operation supporting systems in which conventional automatic control engineering and/or knowledge engineering is applied.

In addition, although a detailed description is omitted, the present invention can of course carry out various controls relating to the maintenance and management of a water purifying plant, such as water level control.

A further embodiment of the present invention will next be described. Similarly to the preceding embodiments, the present invention is applied to support an operation of a water purifying plant.

In this embodiment, the learning of a neural network is performed with plural past patterns of (1) weather, (2) quantities of solar radiation at different time points in the respective seasons, (3) the quantity, quality and temperature of water measured, and (4) the feeding rate or concentration of chlorine. The above information (1) to (3) on a given day are inputted to the neural network so learned (i.e., the neural network for prediction), whereby the neural network is allowed to predict the unknown value (4) to control the feeding rate or concentration of pre-chlorine.

The execution process comprises the following steps: (1) learning by the learning neural circuit model (learning neural network), (2) prediction of the feeding rate or concentration of chlorine through association by the learned neural network (predicting neural network), and (3) control of the feeding rate or concentration of chlorine on the basis of the result of the prediction.

Figure 11A:
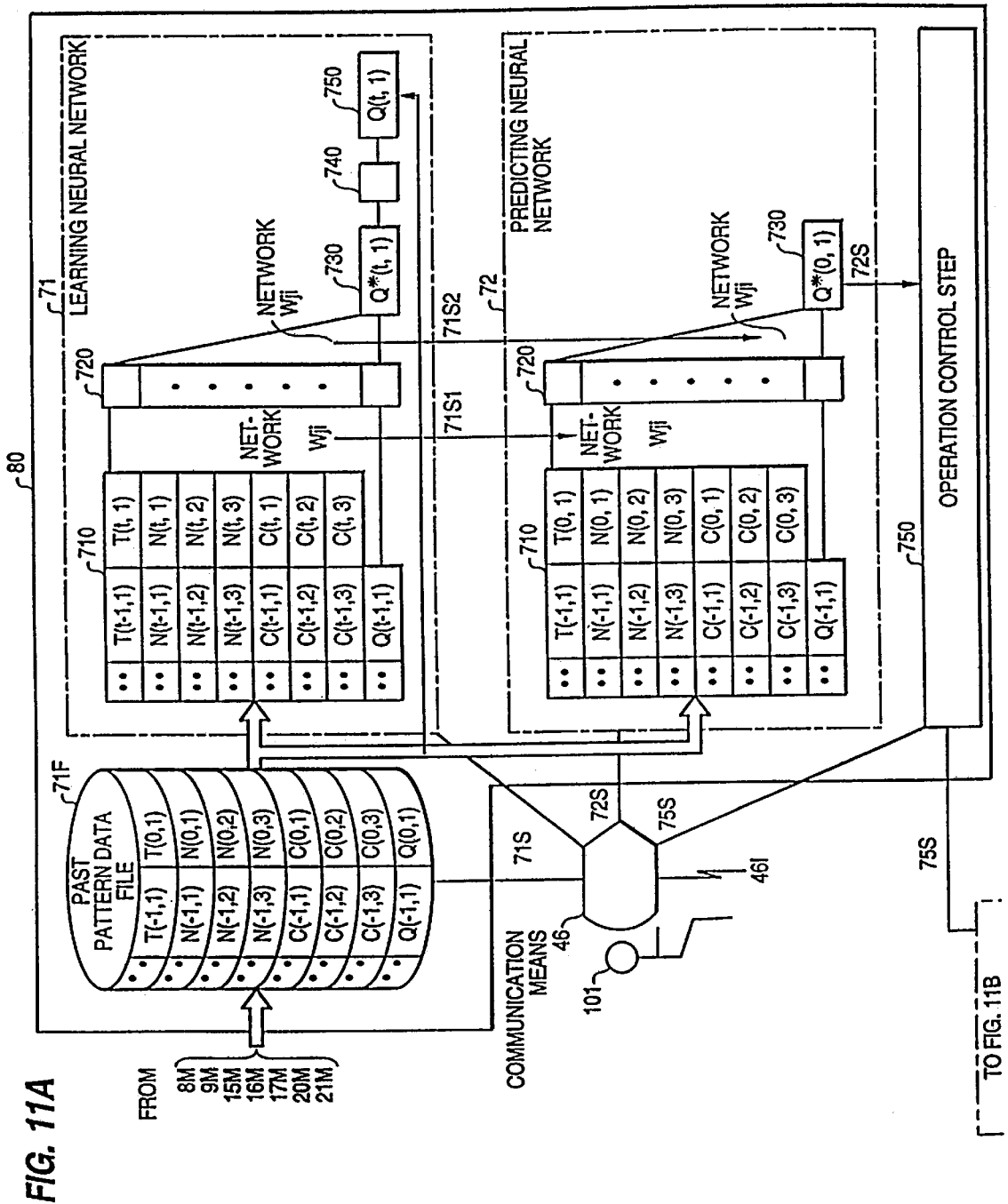
FIG. 11 through FIG. 13 are block diagrams of a further embodiment of the present invention.

The construction and operation are now described based on the embodiment of FIG. 11. First of all, the flow of the water purifying plant is described. In the drawing, raw water guided from a river, lake or pond (not shown) is introduced into the receiving basin 9. The raw water is then guided from the receiving basin 9 to the high-speed mixing basin 10, where a flocculant is injected from the flocculant tank 11A, followed by stirring by the stirrer 13 to induce flocculation of fine particles diffused in the raw water. Although omitted in the drawing, alkali agent may be injected as needed. In the floc-forming basin 15 (only one basin is shown in the drawing for the sake of simplicity although there are plural floc-forming basins), flocs (flocculated masses) are allowed to grow under stirring by the stirring paddle 17. The flocs thus grown are allowed to settle in the settling basin 16, and the supernatant is filtered in the filtering basin 17. The water thus filtered is temporarily stored in the purified water basin 20 and the water distribution basin 21, and is then delivered by the pump 22 to individual customers by way of the distributing pipe network 24. For sterilization, chlorine is injected by chlorine feeders 26A, 26B at suitable rates into the receiving basin 9 and the purified water basin 20 from the chlorine tank 25 (in which liquid chlorine or sodium hypochlorite is stored). The chlorine injected into the water receiving basin 9 is called "pre-chlorine", while that injected into the purified water basin 20 is called "post-chlorine".

The water receiving basin 9, the floc-forming basin 15, the settling basin 16, an outlet of the filtering basin 17, the purified water basin 20 and the water distribution basin 21 are provided with instruments 9M, 15M, 16M, 17M, 20M and 21M, respectively. Items to be measured include water temperature, turbidity, alkalinity, pH, electrical conductivity, residual chlorine concentration, chlorine demand, organic substances, iron, manganese, ammoniacal nitrogen, organic nitrogen, water quantity, water level, head loss, and the like. Also provided is an actinometer 8M which measures the quantity of solar radiation (the intensity of light, the intensity of ultraviolet rays, etc.).

Next, the construction of a prediction/operation control unit 80 will be described. The prediction/ operation control unit 80 is a computer system. To facilitate the description of the present invention, a flow diagram of processing is depicted in FIG. 11. Incidentally, the portions indicated as "network" in the drawing include a number of wirings (or communication routes for information) corresponding to the solid lines 702 in FIG. 4.

Firstly, a past pattern data file 71F in the prediction/ operation control unit 80 stores time-series data of (1) the weather which an operator 101 inputs via a communication means 46, (2) season, time, and the quantity of solar radiation measured by the actinometer 8M, (3) the quantity, quality and temperature of water measured by the instruments 9M, 15M, 16M, 17M, 20M, 21M, and (4) the chlorine feeding rate at the chlorine feed pump 26A or the chlorine concentration (the average chlorine concentration after injection). From the past pattern data file 71F, (1) a selected data stream T of weather, (2) a selected data stream N of season, time and solar radiation quantity, (3) a selected data stream C of water quantity, quality and temperature and (4) a selected data stream Q of chlorine feeding rate or concentration are all outputted to the learning neural network 71 either automatically or responsive to an instruction 71S from the communication means 46. Learning is then performed using these data T, N, C, Q, and the results 71S1 and 71S2 of the learning are outputted to the predicting neural network 72. At the predicting neural network 72, the data T, N, C, Q which are required for a prediction are selected from the content of the past pattern data file 71F and are used for the prediction. The results of the prediction are displayed as prediction signals 72S at the communication means 46 and are also outputted to the operation control step 75. Upon receipt of the prediction signals 72S, the operation control step 75 outputs a target value signal 75S for the chlorine feeding rate to the chlorine feed pump 26A to control the feeding rate. At the same time, the target value signal 75S of the feeding rate is displayed at the communication means 46, and the actual feeding rate may then be corrected as needed, namely, if so chosen by the operator. The corrected value is again outputted as the target value signal 75S for feeding rate to the chlorine feed pump 26A.

A description will next be made of the operation of the embodiment of FIG. 11. In the following description, control of the chlorine feeding rate will be described by way of example. It is however to be noted that control of the average chlorine concentration after the injection of chlorine can be effected similarly.

First of all, a description will be made of a method for storing data in the past pattern data file 71F. Past pattern data at a time point t=0 comprise (1) weather $T(0,1)$, (2) season, time and quantity of solar radiation $N(0,1), N(0,2), N(0,3)$, (3) water quantity, quality and temperature $C(0,1), C(0,2), C(0,3)$, and (4) chlorine feeding rate $Q(0,1)$. The water quality $C(0,2)$ is represented by the above-described plural measurement data at the time point t=0. Since the accuracy is obviously improved when these measurement data are all employed, a specific description of a case where plural measurement data are used is omitted herein. In this embodiment, the water quantity will be collectively represented by the symbol $C(0,2)$. Data of these T, N, C and Q are stored in the past pattern data file 71F. Repeating this, data at t=0, −1, −2, . . . are successively stored. Although the present embodiment will be described by setting this time interval at one hour, no particular limitation is imposed on the practice of the present invention no matter whether the time interval is shorter or longer than one hour.

The operation of the learning neural network 71 in the learning step will next be described. At the learning neural network 71, learning is performed upon receipt of selected data from the content of the past pattern data file 71F. The manner of selection and learning of these data will hereinafter be described with reference to FIGS. 11 and 12.

Figure 12:
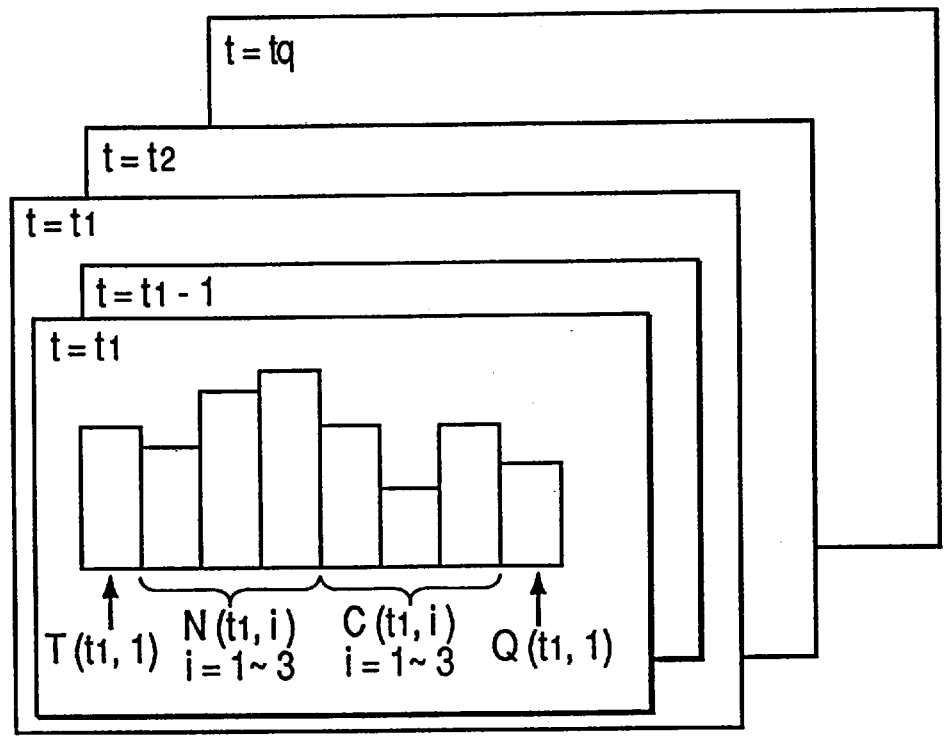

As is depicted in FIG. 12, in regard of (1) the weather $T(0,1)$, (2) the season, time and quantity of solar radiation $N(0,1), N(0,2), N(0,3)$, (3) the water quantity, quality and temperature $C(0,1), C(0,2), C(0,3)$ and (4) the chlorine feeding rate $Q(0,1)$, the operation history is gone back from a given time point t=t1 as a basis, and their corresponding data at t1-1, t1-2, . . . are learned firstly. Similarly, using t=t2 (t2≠t1) as a basis, the pattern data at t2-1, t2-2, . . . are also learned, whereby q pieces of pattern data are learned in total. The learning is conducted by dividing this group of data into input data and teacher data. As is shown in FIG. 1, the input layer 710 is inputted successively with $[1]T(t,1), N(t,1), N(t,2), N(t,3), C(t,1), C(t,2)$ and $C(t,3)$ at a given time point (t=t1, t1, . . . ) and with $T(t-1,1), N(t-1,1), N(t-1,2), N(t-1,3), C(t-1,1), C(t-1,2), C(t-1,3)$ and $Q(t-1,1)$ at a time point gone back from the given time point to the past. Here, it is to be noted that $Q(t-1,1)$ has been added. On the other hand, the teacher layer 750 is inputted with $Q(t,1)$. Learning is performed at the learning neural network 71, which is constructed of the input layer 710, the hidden layer 720, the output layer 730, the comparison layer 740 and the teacher layer 750 and corresponds to the neural circuit model of FIG. 3.

A prediction step by the predicting neural network 72 will next be described. The construction of the predicting neural network 72 is equivalent to that of the neural circuit model of FIG. 6. As is depicted in FIG. 11, the chlorine feeding rate is predicted based on the results of the learning at the learning neural network 71, namely, the distribution of weight factors Wji at the predicting neural network 72. Values of the weight factors Wji (3←2) and Wji (2←1) which have been obtained as a result of the learning, are outputted as signals 71S1 and 71S2 to the predicting neural network 72. Using these signals, a prediction is conducted. Incidentally, the learning neural network 71 and the predicting neural network 72 are independently illustrated for the sake of convenience in FIG. 11. Needless to say, a single neural network can be used commonly.

Figure 13:
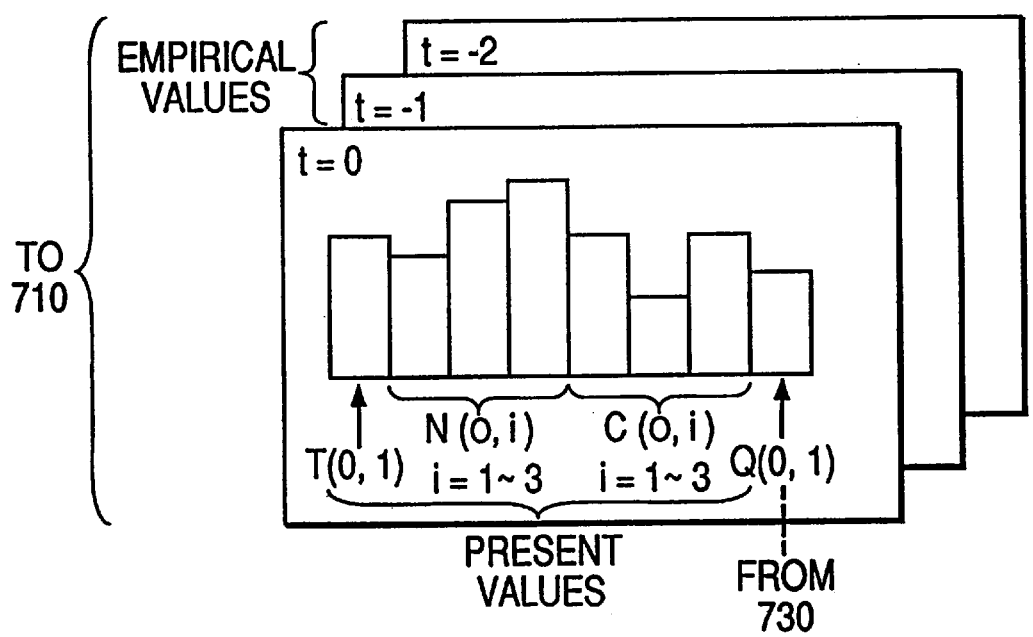

The operation of the predicting neural network 72 will next be described with reference to FIGS. 6 and 13. As is illustrated in FIG. 6, the predicting neural network 72 has a similar construction to the learning neural network 71 except for the omission of the comparison layer 740 and the teacher layer 750. What is performed at the predicting neural network 72 is to predict (4) an unknown chlorine feeding rate Q on the basis of (1) the weather T, (2) the season, time and quantity of solar radiation N and (3) the water quantity, quality and temperature C, which can be predicted or are known at the present time. For this purpose, variable values $Y_i$ set taking t=0 as a basis are inputted as an input pattern to the input layer 710. The variable values Yi are, as shown in FIG. 11 or FIG. 13, [1] the weather T(0,1), (2) the season, time and quantity of solar radiation N(0,1),N(0,2), N(0,3), (3) water quantity, quality and temperature C(0,1),C(0,2),C (0,3), all of which are known at the present time, as well as [2] the data of the variables (1)–(3) and (4) the chlorine feeding rate Q(-1,1) in the past (t=-1). The values T, N, C an Q at t=-2 may be inputted. They are all either data of actual values or already-known data. Based on these values, it is predicted how much chlorine should be injected at the present time, in other words, an unknown target chlorine feeding rate Q(0,1)* is predicted. The results are outputted to the output layer 730. As the calculation procedure until the output, the same calculation as that described above, which makes use of the formulae <1>through <4>, are executed. The target chlorine feeding rate Q(0,i)* is a signal 72S.

The operation control step 75 will hereinafter be described. In the operation control step 75, upon receipt of the signal 72S indicative of the target chlorine feeding rate Q(0,1)*, a signal 75S indicative of the target value of the chlorine feeding rate is outputted to the chlorine feed pump 26A to control the flow rate of chlorine. The frequency of calculation of the signal Q(0,i) is generally every first hour, but this time interval can be set as desired. Of course, a shorter time interval leads to a more improved prediction accuracy. If the chlorine feeding rate for a short time period (e.g., 1 minute) cannot be predicted because of the setting of an unduly long time interval (1 hour in this embodiment), it should be predicted by mathematical interpolation. At the same time, the signal 75S indicative of the target value of the feeding rate (the results of the prediction) is displayed at the communication means 46, whereby the actual flow rate may be corrected at the choice of the operator 101 as needed. For example, a correction such as multiplication of the predicted flow rate by a proportion factor K1 and addition of a constant K2 is effected. The value so corrected is outputted again as the target injection rate value signal 75S to the chlorine feed pump 26A and the chlorine feed pump 26A injects chlorine at the corrected target rate into the receiving basin 9.

The present embodiment has been described taking as a target value the chlorine feeding rate which is actually controlled. Since the objective is to control the chlorine concentration in the water of the water purifying plant, a method in which the post-injection chlorine concentration is used as a target is practical. In this case, the post-injection average chlorine concentration which can be calculated by the following formula <5> is used instead of the chlorine feeding rate Q(t,1)1.

$$Qc(0) = \frac{Q(0, 1)}{QD(0)} \quad <5>$$

where QD(0) is the flow rate of water under treatment. Described specifically, the control is performed as described above except for the use of Qc(0) in lieu of Q(t,1).

A further embodiment of this invention will next be described.

In this embodiment, a neural network is caused to learn a plurality of past patterns of disturbance factors and a plurality of past patterns of actual demands, and disturbance factors on a given day are inputted to the thus-learned neural network to cause the neural network to predict a demand pattern for the given day. The execution process comprises the following steps: (1) learning by a learning neural circuit model (learning neural network), (2) prediction of a demand pattern through association by the learned neural network (predicting neural network), and (3) operational control of the feeding rate on the basis of the results of the prediction.

The present embodiment can be applied for the prediction of a water demand pattern at a water purifying plant, the prediction of a flow rate pattern of sewage flowing into a sewage treatment plant, the prediction of an electric power demand at a power generation plant or a central local-dispatching office, the prediction of a thermal demand pattern at a regional cooling and heating plant, the prediction of an electrical/thermal demand pattern at a cogeneration plant, etc. Here, the construction and operation of this embodiment will be described on the basis of the example of FIG. 14 in which water demand patterns are a water purifying plant in to be predicted.

Figure 14:
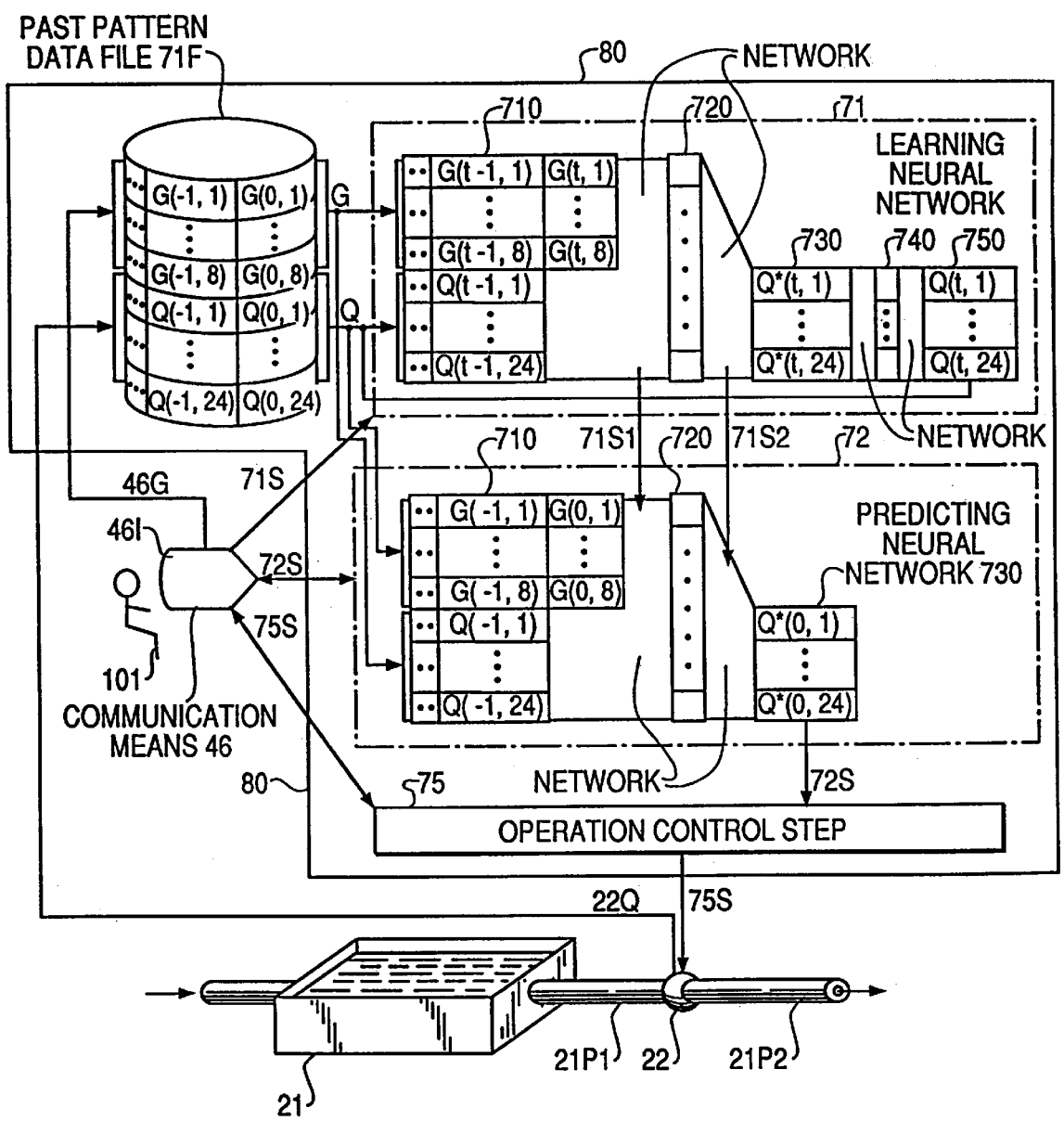
FIG. 14 is a block diagram of a still further embodiment of the present invention.

First of all, the overall construction of the system shown in FIG. 14 will be described. In the drawing, purified water which has been produced at the water purifying plant and contains chlorine injected therein is stored in the water distribution basin 21. The purified water in the water distribution basin 21 is delivered to the pump 22 through a line 21P1 and then to customers via a piping 21P2. Although not shown in the drawing, the piping 21P2 is provided with a valve for the control of both pressure and flow rate. Time-series data of the flow rate, which are operational data of the pump 22, are successively stored in the past pattern data file 71F in the prediction operation control unit 80. The predicting operation control unit 80 is a computer system, and a flow diagram of its processing is shown in FIG. 14 to facilitate the description of the present invention. Further, the portions indicated as "network" in the drawing correspond to the solid lines 702 in FIG. 4.

As the time series data of the flow rate signal 22Q, hourly cumulative data are employed as 22Q and values Q(t,i) (t: day, i: time) are stored. On the other hand, the operator 101 inputs weather, a day of the week, an average temperature, the highest temperature, the temperature at a representative time, the quantity of solar radiation, the existence or non-existence of an vent and its scale, and the like as disturbance signals 46G in the past pattern data file 71F of the prediction/operation control unit 80 via the communication means 46 which comprises a display, a keyboard or voice input unit, etc. As an alternative, data signals of the above-mentioned weather, etc. can also be inputted externally to the communication means 46 through a communication line 461. Needless to say, the disturbance signals 46G are inputted automatically when they are measured by automatic measurement instruments. In this manner, the flow rate signals 22Q and disturbance signals 46G are successively stored in the history pattern data file 71F.

From the past pattern data file 71F, a selected data stream Q of the flow rate signals 22Q and a selected data stream G of the disturbance signals 46G are both outputted to the learning neural network 71 either automatically or in accordance with an instruction 71S from the communication means 46. Learning is performed using these data Q and G, and the results 71S1, 71S2 of the learning are outputted to the predicting neural network 72. For a prediction, the predicting neural network 72 uses the learning results 71S1, 71S2 so received and a data stream of the flow rate signals 22Q and a data stream of the disturbance signals 46G, said data streams having been selected from the past pattern data file 71F. The results of the prediction are displayed as a predicted signal 72S at the communication means 46 and also outputted to the operation control step 75. In the operation control step 75, upon receipt of the predicted signal 72S, a target value signal 75S for the flow rate is outputted to the pump 22 to control the flow rate. At the same time, the target value signal 75S for the flow rate is displayed at the communication means 46 and the actual flow rate may be corrected at the choice of the operator 101 as needed. The corrected value is again outputted as the flow rate signal 75S to the pump 22.

The operation of the present embodiment will next be described with reference to FIG. 14.

A description will first be made of the method for storing the data of past patterns in the past pattern data file 71F. The past pattern data are composed of flow rate signal 22Q and disturbance signal 46G. Expressing the flow rate signal 22Q of the pump 22 by Q(t,i) (t: day, i: time), the data from 1:00 to 24:00 of a given day (t=0) are expressed as Q(0,1), Q(0,2), Q(0,3), ... Q(0,24). These data are outputted to the past pattern data file 71F. When this is repeated every day, the data at t=0, -1, -2, ... are successively stored. On the other hand, expressing by G(t,j) (t: day, j: disturbance number) the disturbance signals 49G to be inputted through the communication means 46, the weather=G(0,1), the day of the week=G(0,2), the average temperature=20 G(0,3), the highest temperature=G(0,4), the temperature at the representative time=G(0,5), the quantity of solar radiation=G(0,6), the existence or non-existence of an event=G(0,7), the scale of the event=G(0,8) and the like on the given day (t=0) are converted into their corresponding numbers. These data are outputted to the past pattern data file 71F.

Next, the operation of the learning neural network 71 in the learning step will be described. The learning neural network 71 receives selected data from the past pattern data file 71F. This data selection method will hereinafter be described. Regarding the disturbance signals G(t,j), in view of the block of the learning neural network 71 of FIG. 14 and selected times (days) t =t1, t.2., t3, . . . , the disturbance signals of the desired number of days which go back to the past from the day t of selection are used. On the day t (t=t1, t2, t3.), G(t,1), . . . , G(t,8) are inputted to the input layer 710 and, as to the preceding day, G(t-1,1), . . . , G(t-1,8) are inputted. However, the weather G(0,1), the day of the week G(0,2), the existence or non-existence of an event G(0,7) and the scale of the event G(0,8) are inputted after converting them into symbols or numbers. As to the flow rate Q(t,i) on the other hand, the flow rates Q(t,1), . . . , Q(t,24) over 24 hours are inputted to the teacher signal layer 750. To the input layer 710, data Q(t-1,1), . . . , Q(t-1,24) of the preceding day (t=-1) and data of a desired number (p) of days going back the preceding days to the past are inputted. Although the accuracy of a prediction is improved if this number of days (p) is large, the data of the preceding day (t=-1) and two days before (t=-2) or so are sufficient from the practical viewpoint. Further, expressing plural past time points (q time points) by t=t1, t2, t.3., . . . , tq, the patterns at the time points t.MDSD/i.MDNM/(i=1, 2, . . . , tq) are inputted as patterns to be learned.

The predicting step by the predicting neural network 72 will next be described. The construction of the predicting neural network 72 is similar to the neural circuit model shown in FIG. 6. As is shown in FIG. 14, a demand pattern is predicted at the predicting neural network 72 on the basis of the results of the learning at the learning neural network 71, namely, the distribution of the weight factors Wji. Values of the weight factors Wji(3←2) and Wji(2←1) which have been obtained as a result of the learning, are outputted to the predicting neural network 72. Using these signals, a prediction is conducted. At first, as input patterns, values of variables Yi set by taking the given day (t=0) as a basis—predicted values of G for the given day and values of G and Q on the preceding day and two days preceding the given day) are inputted to the input layer 710. A demand pattern is next outputted as an output pattern to the output layer 730 in accordance with calculations which use the formulae <1>–<4>. The demand pattern is Q(0,i)* (i=1 to 24) inside the output layer 730 in FIG. 14. This calculation is called "prediction" in the present embodiment. Since a value calculated by prediction is dependent on patterns learned, patterns to be learned must, as described above, be typical patterns at different time points or those at such abnormal times that require attention.

This prediction is carried out before starting the operation on the given day (usually, one day before). Namely, the patterns of Q and G for the two days up to two days preceding the given day and predicted values of the disturbance factors on the given day are inputted. Then, demand patterns are predicted for the given day by the neural network.

In the operation control step 75, upon receipt of the signal 72S indicative of each demand pattern Q(0,i)* (i=1 to 24), a flow rate target value signal 75S is outputted to the pump 22 to control the flow rate. The demand patterns Q(0,i)* are flow rates at the intervals of 1 hour in this embodiment. These time interval can however be set as desired. Of course, a shorter time interval leads to a more improved accuracy of prediction. If the flow rate for a short time period (e.g., 1 minute) cannot be predicted because of the settling of an unduly long time interval (1 hour in this embodiment), it should be predicted by mathematical interpolation. At the same time, the signal 75S indicative of the target value (prediction results) of the flow rate is displayed at the communication means 46, whereby the actual flow rate may be corrected at the choice of the operator 101 as needed. For example, a correction such as multiplication of the predicted flow rate by a proportion factor K1 and addition of a constant K2 is effected. The value so corrected is outputted again as the flow rate signal 75S to the pump 22 and the pump 22 feed water only at the flow rate.

Figure 15:
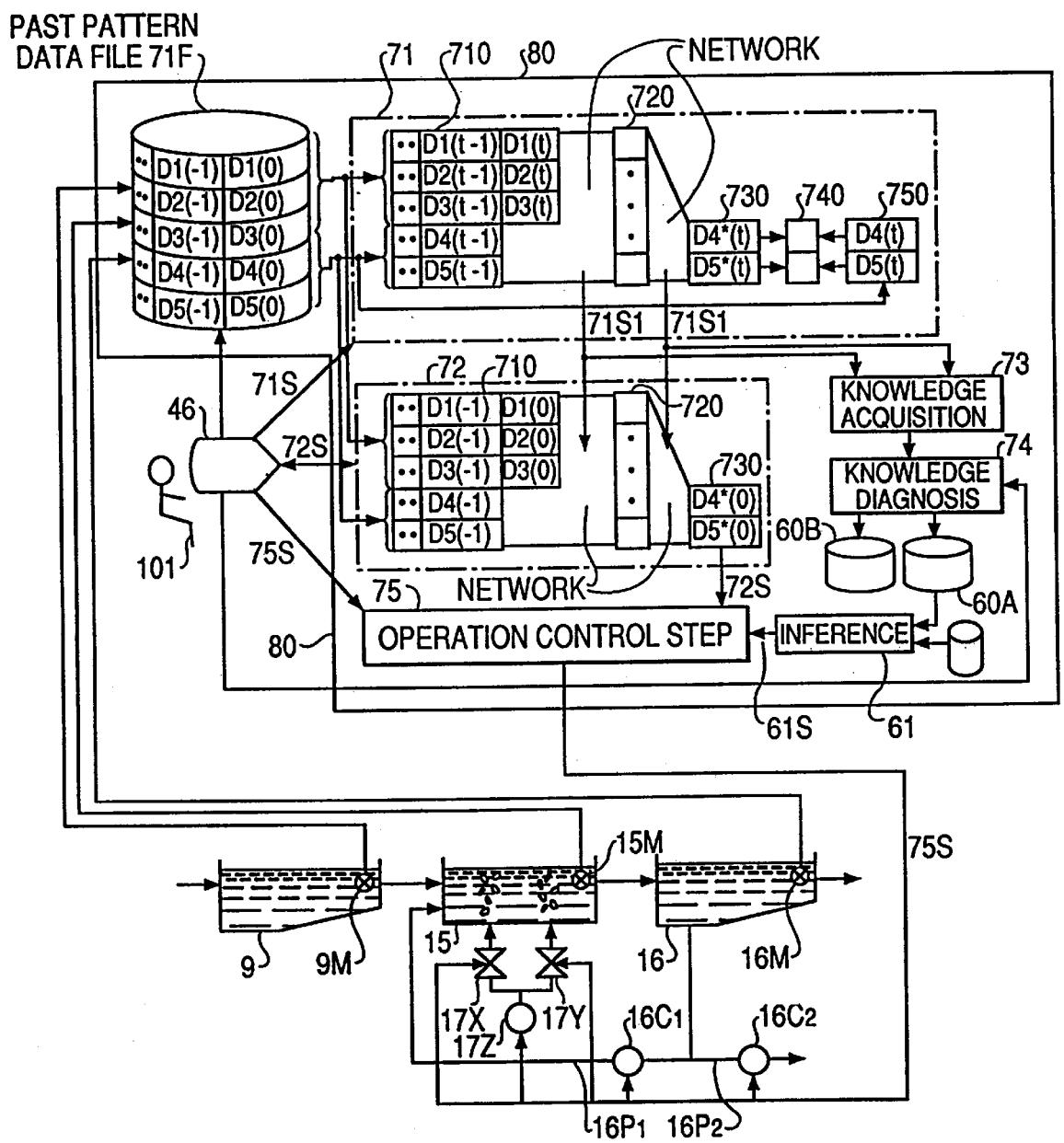
FIG. 15 is a block diagram of a still further embodiment of the present invention.

A still further embodiment will now be described with reference to FIG. 15. This embodiment also relates to the treatment of sewage.

According to the present embodiment, a neural network is caused to learn the history of (1) physical, chemical and biological characteristics of water flowing into a sewage treatment plant, (2) the quantity of state of the plant, (3) season and time, (4) the quantity of evaluation of plant state and (5) the quantity of operation of the plant, whereby the neural network is allowed to automatically acquire knowledge on the variables (1), (2), (3) and (4) and also knowledge on the variables (1), (2), (3) and (5). At the same time, in accordance with the association function of the neural network so learned, a guidance is provided for the operation (including control) of the plant.

An execution process comprises the following steps: (1) learning by a learning neural circuit model (learning neural network), (2) acquisition of knowledge, (3) diagnosis of knowledge 74, (4) inference, (5) association and prediction by the so-learned neural network (predicting neural network), and (6) operation and control of the plant.

The construction and operation of the present embodiment will be described on the basis of the example shown in FIG. 15. Firstly, the flow of the sewage treatment process will hereinafter be described. At the settling basin 9, substances floating in the sewage flowed thereinto are partly removed by gravity sedimentation at first. Sewage overflowed from the settling basin 9 and return sludge from a return sludge line 16P1 flow into an aeration tank 15, first of all. Air is fed to the aeration tank 15 from a blower 17Z via control valves 17X, 17Y, so that the sewage and the return sludge are mixed and agitated. The return sludge (activated sludge) absorbs oxygen from the air, and organic substances in the sewage are therefore decomposed. The thus-treated sewage is then guided to a final settling basin 16. At the final settling basin 16, the activated sludge is allowed to settle by gravity sedimentation, and the supernatant is discharged. The activated sludge settled in the final settling basin 16 is drawn out and a portion of the activated sludge thus drawn out is discharged as a surplus sludge by a pump 16C2 through a surplus sludge line 16P2. The remaining major portion of the activated sludge, said major portion having not been discharged, is returned as return sludge from a return sludge pump 16C1 to the aeration tank 15 via the return sludge line 16P1.

A description will next be made of measuring instruments. The initial settling basin 9, aeration tank 15 and final settling basin 16 are provided with measuring instruments 9M, 15M and 16M, respectively. Items to be measured include the quantity of sewage flowed in, the concentration of floating substances, chemical oxygen demand, pH, nitrogen concentration, ammonia concentration, nitrate nitrogen concentration, nitrite nitrogen concentration, phosphorus concentration, dissolved oxygen concentration, sludge volume index (SVI), etc. as well as image information on bacteria and floating substances.

The construction of the prediction/operation control unit 80 will be described next. The prediction/ operation control unit 80 is a computer system, and a flow diagram of its processing is shown in FIG. 15 to facilitate the description of the present invention. Further, the portions indicated as "network" in the drawing include a number of wirings (or communication routes for information) corresponding to the solid lines 702 in FIG. 4.

Stored in the past pattern data file 71F are time-series data of (1) characteristics of flowed-in water measured by the measuring instrument 9M, (2) the quantities of state of the plant measured by the measuring instruments 15M, 16M, (3) season and time, (4) the quantities of evaluation of the plant state, i.e., some of quantities measured by the measuring instruments 15M, 16M, (5) plant operating quantities of the pump 16C2, the return sludge pump 16C1, the blower 17Z, the control valves 17X, 17Y, and the like.

To the learning neural network 71, (1) a selected data row D1 of the characteristics of the flowed-in water, (2) a selected data row D2 of the quantities of state of the plant, (3) a selected data row D3 of the season and time, (4) a selected data row D4 of the quantities of evaluation of the plant state and (5) a selected data row D5 of the plant operating quantities are all outputted from the past pattern data file 71F either automatically or in accordance with the instruction 71S form the communication means 46. Although each data stream actually contains plural items, it will be expressed by the representative symbols D1–D5 to facilitate the description in the present embodiment. At the learning neural network 71, learning is performed using the data D1, D2, D3, D4, D5. The results 71S1, 71S2 of the learning are both outputted to each of the knowledge acquiring step 73 and the predicting neural network 72.

In the knowledge acquiring step 73, knowledge on the variables (1), (2), (3) and (4) and knowledge on the variables (1), (2), (3) and (5) are converted into their corresponding symbols or words on the basis of the signals 71S1, 71S2. In the knowledge diagnosing step 74, the knowledge obtained in the knowledge acquiring step 73 is stored in the candidate knowledge base 60B or knowledge base 60A responsive to an instruction (not shown) from the communication means 46. The inference system 61 performs inference upon receipt of knowledge from the knowledge base 60A and pre-inputted knowledge from a knowledge base 60C, and outputs a signal 61S to the operation control step 75.

On the other hand, the predicting neural network 72 chooses data, which are required for a prediction, from the past pattern data file 71F and uses them for the prediction. As the predicted signal 72S, the results of the prediction is displayed at the communication means 46 and is also outputted to the operation control step 75.

In the operation control step 75, signals 75S are outputted responsive to the predicted signal 72S and the signal 61S, whereby (5) the plant operating quantities of the pump 16C2, the return sludge pump 16C1, the blower 17Z, the control valves 17X, 17Y, and the like are controlled. At the same time, the control target value signal 75S is displayed at the communication means 46, and the quantity of actual control is corrected at the choice of the operator 101 as needed. The value thus corrected it again outputted.

Next, the operation of the present invention will be described with reference to FIG. 15.

First of all, a description will be made of the method for storing data in the past pattern data file 71F. Past pattern data D1(0)–D5(0) at the time t=0 are stored in the past pattern data file 71F. This is repeated to successively store data at t=0, −1, −2, . . . . This embodiment will be described assuming, by way of example, that the time interval be 1 hour. This setting of the time interval does not impose any particular limitation on the practice of the present invention.

The operation of the learning neural network 71 in the learning step will be described hereinafter. At the learning neural network 71, learning is carried out upon receipt of selected data from the past pattern data file 71F. The manner of selection and learning of these data will be described below.

With respect to D1–D5, the time is gone back to the past from a given time point t =ti as a basis and the pattern data at t1-1, t2-2, . . . are learned at first. Similarly, going back from t=t2 (t2≠t1) as a basis, the pattern data at t1-1, t1-2, . . . are learned. Accordingly, q pieces of pattern data are learned in total. Upon selection of these q pieces of patterns, it is desirable to choose them from typical past patterns. The learning is effected by dividing this group of data into input data and teacher data. As is shown in FIG. 15, the input layer 710 is inputted successively with D1(t)–D3(t) at the given time point t (t=t1, t1, . . . ) and D1(t-1)–D5(t-1) at a time point gone back from the time point t to the past. It is to be noted here that D4(t-1), D5(t-1) are added. Then, a similar operation is performed with respect to the pattern data at t=t-2, t-3, . . . . On the other hand, the teacher layer 750 is inputted with D4(t) and D5(t). The learning is carried out at the learning neural network 71 which is constructed of the input layer 710, the hidden layer 720, the output layer 730, the comparison layer 740 and the teacher layer 750.

At the learning neural network 72, unknown values of the variables (4) and (5) are predicted corresponding to the variables (1), (2) and (3). For this purpose, variable values $Y_i(D1(i)-D3(0))$ set for t=0 as a basis and variable values Yi(D1(i)–D5(i), i=-1, -2, . . . ) set for t=-1, -2, . . . as basis are inputted at input patterns to the input layer 710. These variable values Yi consists, as shown in FIG. 1, of [1] the known values of the variables (1), (2) and (3) at the present time and [2] the values of the variables (1)–(5) at the past time points (t=-1, -2, . . . ). It is to be noted that these values are all either actual values or known data. Calculations of the above formulae <1>–<4> are performed based on these values, and (4) unknown plant state evaluation quantities (the quality of treated water) D4*(0) and (5) unknown plant operation quantities (return/surplus sludge quantity, aerating air quantity) D5*(0) are outputted to the output layer 730. Regarding the quantities (4), their signals are displayed as a guidance at the communication means 46. As to the quantities (5), a control signal 72S is outputted to the operation control step 75.

The operation control step 75 will herein-after be described. In the operation control step 75, the signal 72S corresponding to D5*(0) and the result signal 61S from the inference system 61 are received. Their conformability are checked. If the signal 72S is not contradictory with the signal 61S, the signal 75S is outputted as a target value of the quantity of an operation of the plant to the pump 16C2, the return sludge pump 16C1, the blower 17Z, the control valves 17X, 17Y, etc. If there is a contradiction on the contrary, the contradiction is reported to the operator through the communication means 46 so that a correction is effected. Although the frequency of the control is every hour in this embodiment, this time interval can be set as desired. Of course, a smaller time interval leads to a more improved accuracy of prediction. If the chlorine feeding rate for a short time period (e.g., 1 minute) cannot be predicted because of the setting of an unduly long time interval (1 hour in this embodiment), it should be predicted by mathematical interpolation. At the same time, the signal 75S indicative of the target value of the feeding rate (the results of the prediction) is displayed at the communication means 46, whereby the actual operation may be corrected at the choice of the operator 101 as needed.

Figure 16:
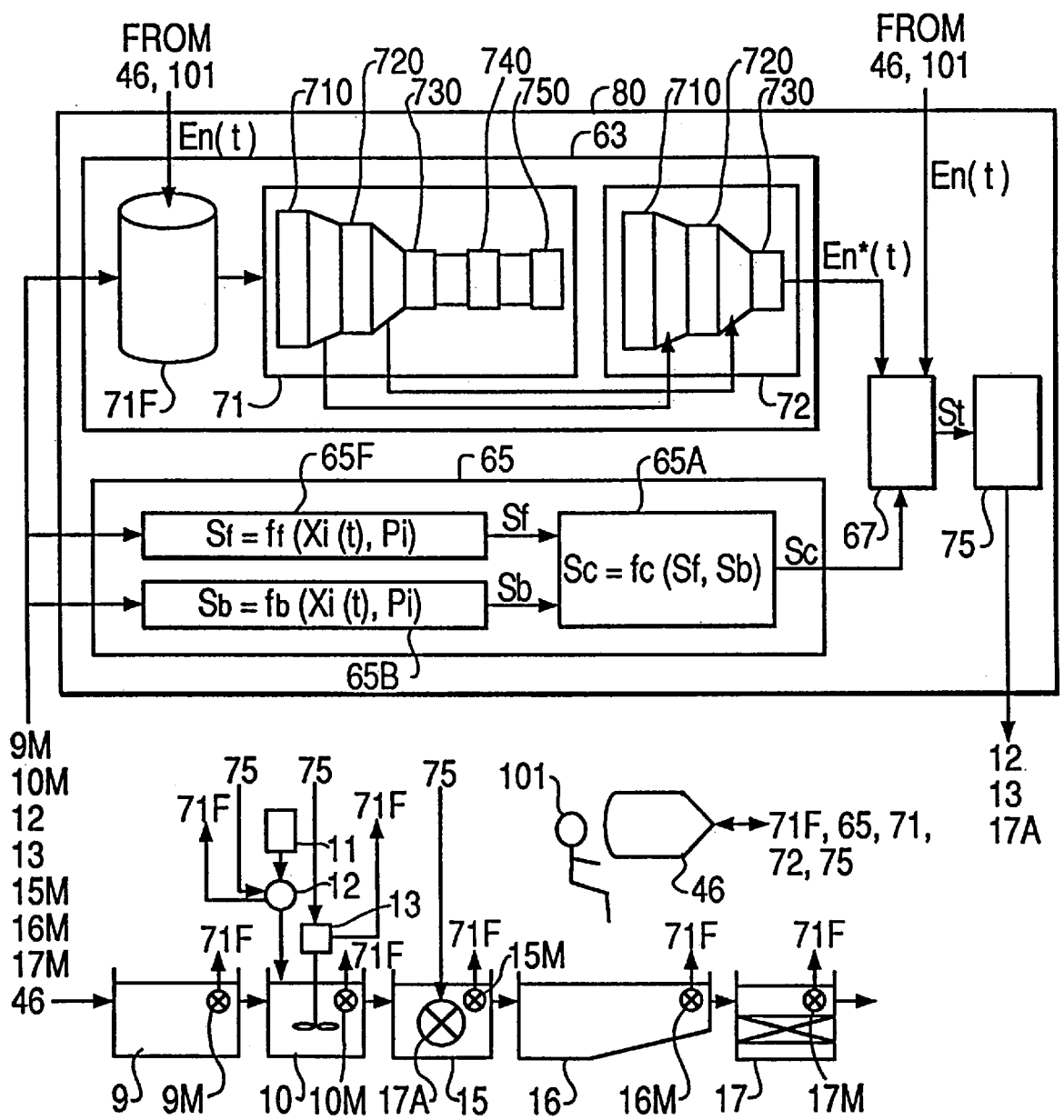
FIG. 16 and FIG. 17 are schematic illustrations of a still further embodiment of the present invention.

A still further embodiment is illustrated in FIG. 16.

This embodiment relates to a method for outputting a target value of control by a transcendental model on the basis of observed quantities of a process. The term "transcendental model" in this embodiment means a process model or control model already known with respect to a target process. The present embodiment includes a method for automatically producing an "error prediction model" to predict an error to be outputted from the transcendental model and a method for automatically producing a "parameter adjustment model" to optimize parameters of the transcendental model. Since the models are both corrected by the operator, each of the models is called the "operator model" in the present embodiment. After first describing one embodiment of the former with reference to FIG. 16, the latter will be described.

FIG. 16 shows one embodiment as applied to the control of injection of a flocculant in a water purifying process. The flow of the water purifying plant will be described at first. In the drawing, raw water is introduced into the receiving basin 9 from a river, lake or pond (not shown). The high-speed mixing basin 10 receives water from the receiving basin 9, to which the flocculant is injected by the flocculant feed pump 12 from the flocculant tank 11. The stirring blade 14 is driven by the stirrer 13. In some instances, an alkali agent may be injected to promote formation of flocs. This is however omitted. The floc-forming basin 15 receives water from the high-speed mixing basin 10 and allows flocs (aggregates of fine particles) to grow. The floc-forming basin 15 (there are usually plural floc-forming basins but the rest of the floc-forming basins are omitted in this embodiment) is provided with the stirring paddle 17A which rotates slowly. The flocs are allowed to settle in the settling basin 16, and the supernatant is filtered in the filtering basin 17. For sterilization, chlorine is injected at suitable rates into the receiving basin 9 and the purified water basin (not shown) from the chlorine tank 25 by the chlorine feeder 26.

A description will next be made of measuring instruments. To measure the quality of the raw water, the water receiving basin 9 is provided with the measuring instrument 9M. Items to be measured include water temperature, turbidity, alkalinity, pH, electrical conductivity, residual chlorine concentration, chlorine demand, water temperature (sic.), water level, etc. The floc-forming basin 15 is provided with the measuring instrument 15M. The measuring instrument 15M includes means for measuring the items to be measured by the above measuring instrument 9M and, in addition, underwater image pick-up means such as a marine camera and image processing means. The settling basin 16 is provided with the measuring instrument 16M. If necessary, the high-speed mixing basin 10 is provided with a measuring instrument 10M similar to the measuring instrument 15M. The filtering basin 17 is provided with the measuring instrument 17M. Items to be measured by these measuring instruments are the same as those to be measured by the above measuring instruments 9M, 15M. The above measurement items, operation factors (the flocculant feed pump 12, stirrer 13, stirring paddle 17A) and quantities making up the operator model (including a prediction error to be described subsequently and the parameters of the transcendental model) will be called "observed quantities" in the present embodiment.

Next, the outline of the construction and operation of the prediction/operation control unit 80 will be described. The prediction/operation control unit 80 is a computer system. To facilitate the description of the present invention, a flow diagram of processing is depicted in FIG. 16. A transcendental model calculation step 65 receives data of measured quantities (parameters Pi of the measuring instruments 9M, 15M, 16M, flocculant feed pump 12, stirrer 13, stirring paddle 17A, prediction error En(t), and transcendental model) and outputs signals Sc to a control quantity calculation step 67. On the other hand, the past pattern data file 71F successively stores the data of the measured quantities. At an operator model 73, the learning neural network 71 receives a selected data row from the past pattern data file 71F to perform learning. The predicting neural network 72 receives the signals 71S1, 71S2 from the learning neural network 71 and outputs signals En*(t). In the control quantity calculation step 67, upon receipt of the signals En*(t) or a correction value En(t) by the operator 101 and the signals Sc, signals St are outputted. In the operation control step 75, the signals 75S are outputted upon receipt of the signals St to control the flocculant feed pump 12, stirrer 13 and stirring paddle 17A. The communication means 46 communicates via the operator 101 with the past pattern data file 71F, transcendental model calculation step 65, learning neural network 71, predicting neural network 72 and operation control step 75. Incidentally, the constructions of the learning neural network 71 and predicting neural net work 72 are as shown in FIG. 3 and FIG. 6, respectively.

Next, the operation of the operation control unit 80 will be described in detail.

The transcendental model calculation step 65, upon receipt of data of observed quantities, outputs signals to a feed forward control model (hereinafter called "FF model") 65F and a feedback control model (hereinafter called "FB model") 65B, respectively. Here, the FF model 65F and FB model 65B are merely exemplary transcendental models. Therefore, transcendental models other than feedback/feed forward models can obviously be employed. Each of the FF model 65F and FB model 65B, upon receipt of the observed quantities Xi(t), outputs a signal which is adapted to control the injection of the flocculant. The general formula of the FF model 65F is represented by the following formula:

$$Sf = Ff(Xi(t), Pi) \qquad (i)$$

where Sf: output signal from the FF model 65F, X.i(t): observed quantities at the time t, and Pi: parameters of the FF model.

An illustrative specific formula model of the formula (i) is represented by the following formula:

$$Sf = P1 \cdot (X1(t))^{P2} + P3 \qquad (ii)$$

where X1(t): the turbidity of raw water, P1, P2, P3: parameters.

The general formula of the FB model 65B is represented by the following formula:

$$Sb = Fb(Xi(t), Pi) \qquad (iii)$$

where Sb: output signal from the FB model 65B, Xi(t): observed quantities at the time t, and Pi: parameters of the FB model.

An illustrative specific formula model of the formula (ii) is represented by the following formula:

$$Sb = P1 \cdot (X2(t) - X2(t-\tau)) \qquad (iv)$$

where X2(t): the turbidity at the output of the settling basin at the time t, X2(t−2): the tabidity at the output of the settling basin at the tme t−τ, P1: parameter.

Although only X1(t) and X2(t) are contained by way of example on the right-hand sides of the formulae (ii) and (iv), other observed quantities can also be used obviously.

A model output value calculation step 65A, upon receipt of the signals Sf and Sb, outputs a signal Sc to the control quantity calculation step 67. Its general formula is represented by the following formula:

$$Sc = Fc(Sf, Sb) \qquad (v)$$

An exemplary specific formula model of the formula (v) can be expressed by the following formula:

$$Sc = Sf + Sb \qquad (vi)$$

Therefore, the transcendental model 65 outputs the signal Sc, which predicts a quantity of the flocculant to be injected, on the basis of the observed quantities Xi(t) (i=1–n). Since a difference arises between the predicted value Sc and the actual value in the past (it is to be noted that the latter value is a value added with the correction value En(t) inputted by the operator and is more correct than the prediction by the transcendental model), this "prediction error" (operator's correction value) is outputted from the neural network instead of the operator.

A description will next be made of a method for storing observed quantities in the past pattern data file 71F. The observed quantities Xi(0) (i=1 to n) at the time t=0 are stored in the past pattern data file 71F. This is repeated to successively store quantities observed at t=0, −1, −2, . . . . The time interval is for example 1 hour. It is however to be noted that no limitations whatsoever will be imposed on the practice of the present invention by the setting of this interval.

The operator model 73 will next be described. First of all, the operation of the learning neural network 71 in the learning step will be described. The manner of selection of data and learning at the learning neural network 71 will now be described. With respect to Xi(t) (i=1 to n), going back to the past from a given time point t=t1 as a basis, the data observed at t1-1, t1-2, . . . are learned at first. The value k of t1-k can be chosen as desired. Similarly, using t=t2 (t2≠t1) as a basis, the pattern data at t2-1, t2-2, . . . are learned, whereby q pieces of pattern data are learned in total. These q pieces of patterns may desirably be selected from typical patterns in the past. Since the time ti is a given time, continuous learning can bring about the effect that variations in state can be coped with more easily.

The learning is effected by dividing this group of data into input data and teacher data. The term "input data" means factors out of the observed quantities, said factors affecting the prediction error pertaining to the quantity of the flocculant to be injected. The term "teacher data" indicates the prediction error En(t). Further, the input data is a factor based on which the operator makes a judgment. On the other hand, the teacher data is a factor to be controlled by the operator (in this embodiment, the prediction error En(t) between a value of the quantity of the flocculant to be injected as predicted by the transcendental model and a value actually measured). For the same of convenience, assume that values of the input data are Xi(t) (i=1 to n−1) and the teacher data consists of Xn(t), namely, prediction errors En(t) alone). It is to be noted that En(t) are correction values added by the operator to the values predicted by the transcendental model. Incidentally, the combination of these input and output data can be chosen as desired in accordance with the objective.

A prediction error En(t1) at the time t=t1 is inputted to the teacher layer 750. Inputted to the input layer 710 are X1(t1) (i=1 to n−1) and Xi (t1) at t=t1-1, t1-2, . . . . As will be described subsequently, the learning is executed at the learning neural network 71 which is constructed of the input layer 710, the hidden layer 720, the output layer 730, the comparison layer 740 and the teacher layer 750. This simulates that the prediction error at the time t=t1 is affected by the quantities observed at that time point and in the past and the prediction errors in the past. Learning is also performed with respect to given time points t (t=t1, t2, . . . ) in a similar manner.

The operation of the predicting neural network 72 will next be described. At the predicting neural network 72, variable values Yi (i=1 to p) set using the present time point (t=0) as a basis are firstly inputted as input patterns to the input layer 710. It is to be noted that these values are all either actual values or known data. Based on these values, the calculations of the above formula <1>–<4> are performed, and a prediction error En*(0) at t=0 is outputted from the output layer 730. Namely, En*(0) is outputted in place of an error (correction value En(0)) predicted by the operator.

In the control quantity calculation step 67, the signal En*(0) and the signal Sc are received, and St is calculated in accordance with the formula (vii), followed by the output of the same.

$$St = Sc + En^*(0) \quad \text{(vii)}$$

Namely, a value obtained by adding the error En*(0), which has been predicted by the operator model 63 (neural network), to the value Sc predicted by the transcendental model is used. Since the prediction error En*(0) has already learned operator's past operation patterns, the formula (vii) makes it possible to perform control comparable to that conducted by the operator.

The operation control step 75 will hereinafter be described. In the operation control step 75, signals 75S are outputted upon receipt of the signal St so that the flocculant feed pump 12, stirrer 13 and stirring paddle 17A are controlled. The frequency of control is every hour in this embodiment. This time interval can however set as desired. Of course, a shorter time interval leads to a more improved prediction accuracy. If an error for a short time period (e.g., 1 minute) cannot be predicted because of the setting of an unduly long time interval (1 hour in this embodiment), it should be predicted by mathematical interpolation.

Pursuant to instructions from the operator 101, the communication means 46 perform a modification to the filing method for the past pattern data file 71F, a modification to the model in the transcendental model calculation step 65, the display of the progress in and results from the learning neural network 71 and the predicting neural network 72, and corrections to the signals 75S from the operation control step 75.

It is advantageous effects of the example of FIG. 16 that the error of the transcendental model can be consistently and progressively decreased owing to the learning of actual results by the neural network without the need for intervention by an operator and the accuracy of control can be improved over the conventional methods.

The embodiment of FIG. 16 has been described, taking by way of example the method in which the error prediction model for the prediction of the error of the transcendental model (operator's correction value) is automatically produced at the neural network. In the above description, the operator model 63 was the error prediction model.

A description will next be made of a method for automatically producing, in the operator model 63, a "parameter adjustment model" for the optimization of parameters of the transcendental model. This example is to automatically perform the work that an operator adjusts the parameters Pi of the FF model 65F and FB model 65B in view of the outputs Sc from the transcendental model calculation step 65. This example is different from the example of FIG. 16 in that the parameters Pi of the transcendental model are inputted to the teacher signals to predict optimum values of Pi. This example will be described with reference to FIG. 17.

Figure 17:
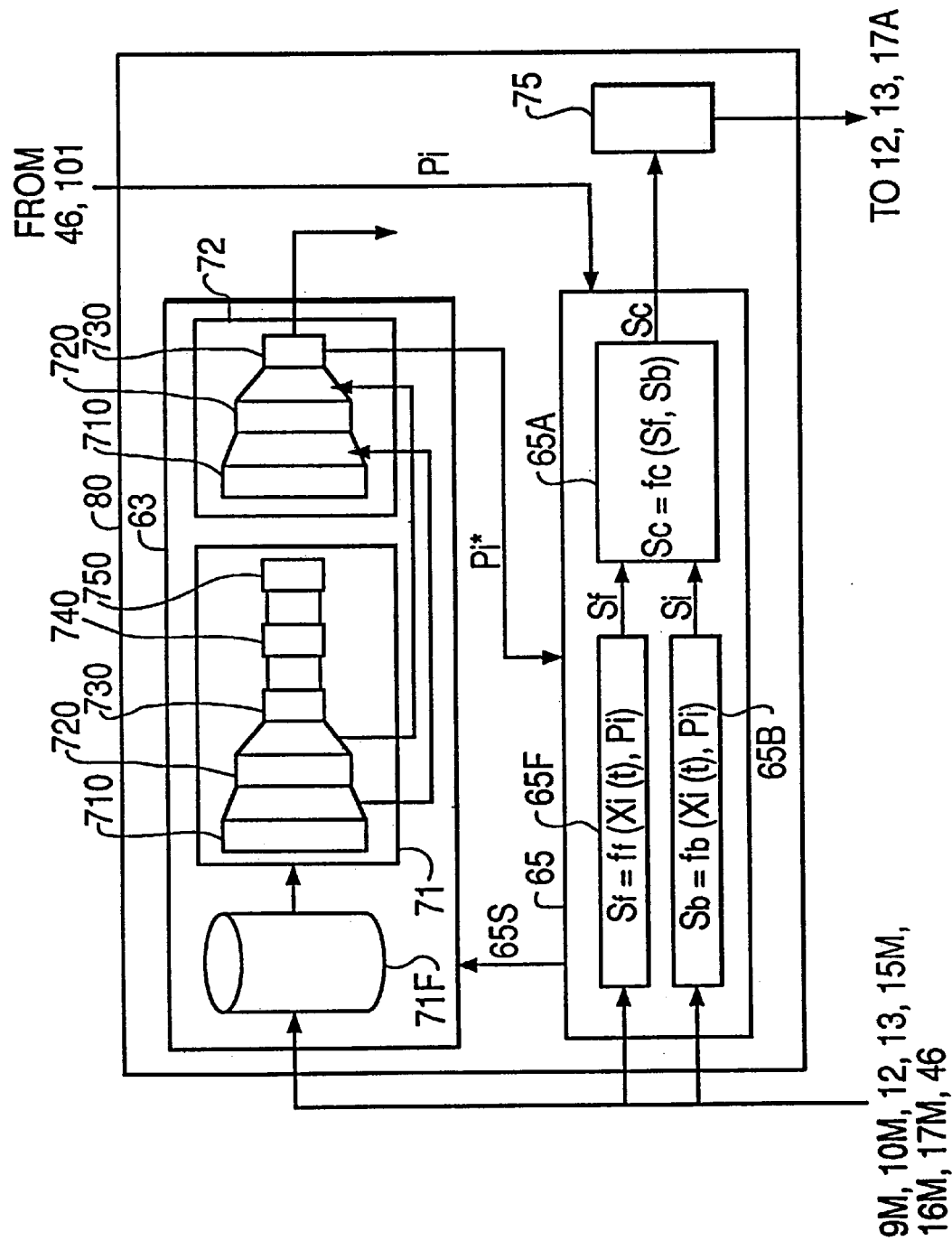

In the example of FIG. 17, the parameters Pi of the FF model 65F and FB model 65B are set by the operator 101 via the communication means 46. In connection with the Pi values so set, the parameters Pi (signals 65S) are inputted as some of observed quantities from the transcendental model calculation step 65 to the past pattern data file 71F and are stored there. As teacher signals for the learning neural network 71, actual values of Pi inputted by the operator are used and, following a similar procedure to that of the example of FIG. 16, the actual results in the past are learned. Predicted values Pi* of these Pi values are outputted from the predicting neural network 72, and are used as parameters Pi of the FF model 65F and FB model 65B without intervention by the operator. The FF model 65F and FB model 65B performs the calculations of the formulae (i)–(iv) by using the predicted values Pi*, and output signals Sf and Sb, respectively. In the model output value calculation step 65A, upon receipt of the signals Sf and Sb, signals Sc are outputted to the operation control step 75. In the operation control step 75, signals 75S are outputted responsive to the signals Sc so that the flocculant feed pump 12, stirrer 13 and stirring paddle 17 are controlled.

It is the advantageous effects of the example of FIG. 17 that the adjustable parameters of the transcendental model can always be set optimally without the need for intervention by a man as a result of learning of actual results by the neural network and the accuracy of control can be improved compared to the conventional methods.

The present invention has been described on the basis of the embodiment applied to the water purifying process. Needless to say, the present invention can be applied to other general processes.

Figure 18:
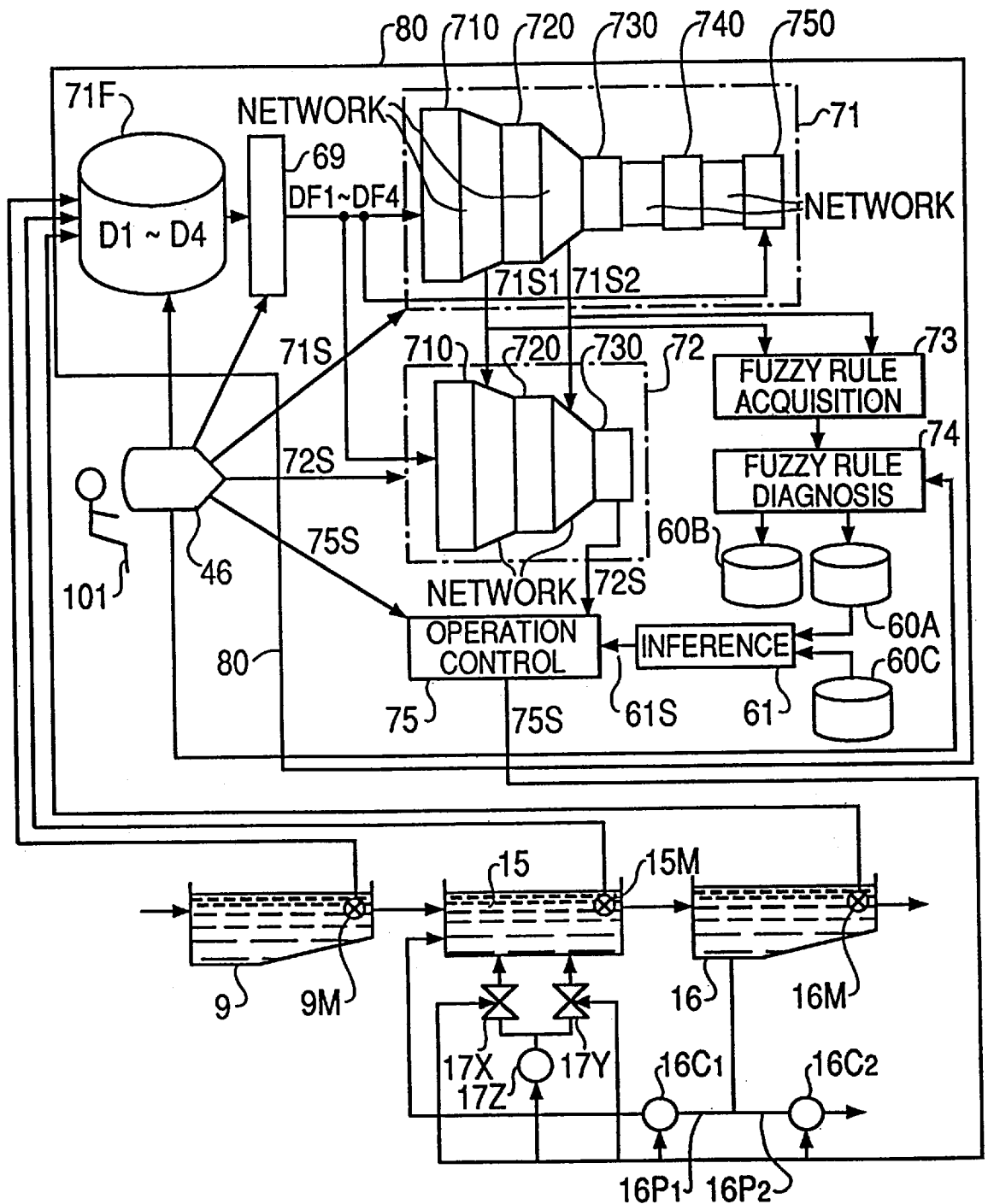
FIG. 18 and FIG. 19 are schematic illustrations of a still further embodiment of the present invention.

In a still further embodiment of FIG. 18, the values of (1) disturbance, (2) the quantity of state of the process, (3) the quantity of evaluation and (4) the quantity of operation of the process at plural time points in the past are firstly converted into membership values in accordance with predetermined membership functions, respectively. These converted values are then inputted to the neural network to learn the relationships among the variables (1) to (4). From the distribution of weight factors in the neural network so learned, a fuzzy rule with certainty factor is derived. Based on the fuzzy rule, inference is performed to support or control the operation. This execution process comprises the following steps:

1) converting values of the variables (1)–(4) into the corresponding membership values in accordance with their respective membership functions;
2) learning by the learning neural network;
3) obtaining a fuzzy rule with a certainty factor from the neural network so learned;
4) diagnosing the fuzzy rule;
5) performing fuzzy inference;
6) conducting a prediction by the learned neural network; and
7) controlling an operation of the process.

One example in which the present invention is applied to a sewage treatment process will be described with reference to FIG. 18.

The construction and operation of the sewage treatment process will hereinafter be described. At the initial settling basin 9, substances floating in flowed-in sewage are partly removed by gravity sedimentation at first. Sewage overflowed from the settling basin 9 and return sludge from the return sludge line 16P1 flow into the aeration tank 15, first of all. Air is fed to the aeration tank 15 from the blower 17Z via the control valves 17X, 17Y, so that the sewage and the return sludge are mixed and agitated. The return sludge (activated sludge) absorbs oxygen from the air, and organic substances in the sewage are therefore decomposed. The thus-treated sewage is then guided to the final settling basin 16. At the final settling basin 16, the activated sludge is allowed to settle by gravity sedimentation, and the supernatant is discharged. The activated sludge settled in the final settling basin 16 is drawn out and a large majority of the activated sludge thus drawn out is returned as return sludge from the return sludge pump 16C1 to the aeration tank 15 via the return sludge line 16P1. The balance is discharged as surplus sludge by the surplus sludge pump 16C2 through the surplus sludge line 16P2.

A description will next be made of measuring instruments. The initial settling basin 9, aeration tank 15 and final settling basin 16 are provided with measuring the measuring instruments 9M, 15M and 16M, respectively. Items to be measured include the quantity of sewage flowed in, the concentration of floating substances, chemical oxygen demand, pH, nitrogen concentration, ammonia concentration, nitrate nitrogen concentration, nitrite nitrogen concentration, phosphorus concentration, dissolved oxygen concentration, sludge volume index (SVI), etc. as well as image information on bacteria and floating substances.

The construction of the prediction/operation control unit 80 will be described next. The prediction/operation control unit 80 is a computer system, and a flow diagram of its processing is shown in FIG. 15 to facilitate the description of the present invention. Stored successively in the past pattern data file 71F are data measured by the measuring instruments 9M, 15M, 16M. The data stream thus stored is outputted to the membership conversion step 69. In the membership conversion step 69, the values of the variables (1)–(4) are converted into the corresponding membership values and the resulting signals are outputted to the learning neural network 71. At the predicting neural network 72, signals 72S are outputted upon receipt of signals 71S1 and 71S2 from the learning neural network 71. In a fuzzy acquisition step 73 on the other hand, the signals 71S1 and 71S2 are received from the learning neural network 71. In a fuzzy rule diagnosis step 74, signals are received from the communication means 46 and the fuzzy rule acquisition step 73 are stored in a candidate fuzzy rule base 60B or a fuzzy rule base 60A. A fuzzy inference system 61 receives signals from the fuzzy rule bases 60A, 60C and outputs signals 61S to the operation control step 75, whereby the surplus sludge pump 16C2, return sludge pump 16C1, blower 17Z, and control valves 17X, 17Y. Pursuant to instructions by the operator, the communication means 46 performs communication with the past pattern data file 71F, learning neural network 71, predicting neural network 72, operation control step 75 and fuzzy rule diagnosis step 74. Incidentally, the portions indicated as "network" in the drawing include a number of wirings (or communication routes for information) corresponding to the solid lines 702 in FIG.

The operation of the prediction/operation control unit 80 will next be described.

The past pattern data file 71F stores time-series data of (1) disturbance characteristics measured by the measuring instrument 9M, (2) the quantities of state of the process measured by the measuring instrument 15M, (3) the quantities of evaluation of the process measured by the measuring instrument 16M, and (4) process operating quantities of the surplus sludge pump 16C2, the return sludge pump 16C1, the blower 17Z, the control valves 17X, 17Y, and the like.

In the membership conversion step 69, data rows D1, D2, D3, D4 selected from the values of (1) the disturbance characteristics, (2) the quantities of state of the process, (3) the quantities of evaluation of the process and (4) the process operating quantities are received from the past pattern data file 71F either automatically or in accordance with the instruction 71S from the communication means 46, and are then converted into the corresponding membership values. The data rows individually contain plural items as a matter of fact, but these items are represented by their representative symbols D1 to D4 in the present embodiment so as to facilitate the description.

The learning neural network 71 performs learning using the membership values converted above, and the results 71S1 and 71S2 of the learning are outputted to the fuzzy rule acquisition step 73 and the predicting neural network 72, respectively.

In the fuzzy rule acquisition step 73, the candidate fuzzy rules relating to the variables (1) to (4) are converted into the corresponding symbols or words on the basis of 71S1 and 71S2. In the fuzzy rule diagnosis step 74, the fuzzy rules obtained in the fuzzy rule acquisition step 73 are stored in the candidate fuzzy rule base 60B or the fuzzy rule base 60A in accordance with an instruction from the communication means 46. The fuzzy inference system 61 performs inference upon receipt of the fuzzy rule 60A and the pre-inputted fuzzy rule base 60C and then outputs signals 61S to the operation control step 75.

At the predicting neural network 72 on the other hand, data required for prediction are selected from the past pattern data file 71F and are used for prediction. Signals 72S representing the results of the prediction are displayed at the communication means 46 and are also outputted to the operation control step 75.

In the operation control step 75, the predicted signals 72S and signals 61S are received and signals 75S are outputted, whereby process controlling quantities of (1) the surplus sludge pump 16C2, return sludge pump 16C1, blower 17Z and control valves 17X, 17Y and the like are controlled. At the same time, control target value signals 75S are displayed at the communication means 46, and the actual control quantities may be corrected at the choice of the operator 101 as needed. Corrected values are outputted again.

Next, the operation of the present invention will be described in detail with reference to FIG. 18.

First of all, a description will be made of a method for storing data in the past pattern data file 71F. The past pattern data D1(0) to D4(0) at the time t=0 are stored in the past pattern data file 71F. This is repeated to successively store the past pattern data at t=0, −1, −2, . . . . The time interval may be one hour by way of example. No limitations are imposed on the practice of the present invention by the setting of this time interval.

Figure 19:
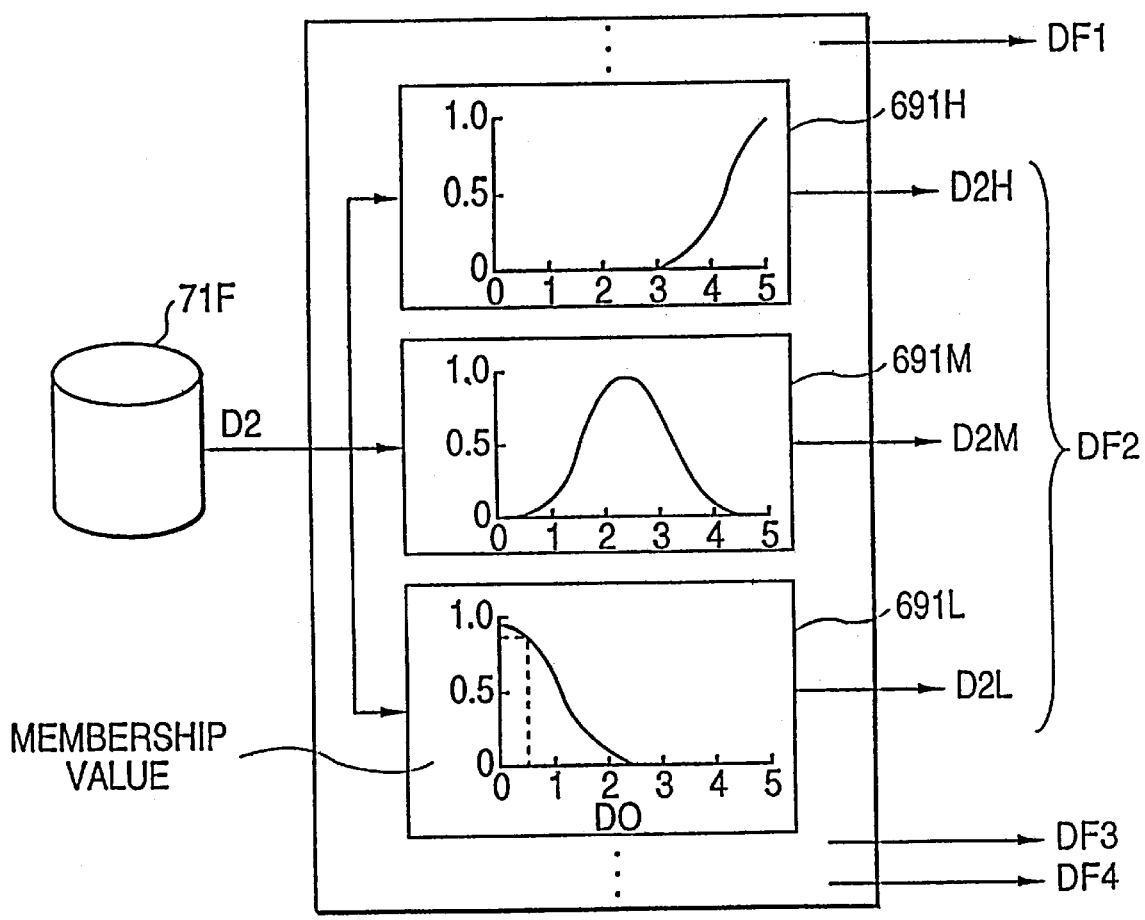

The membership conversion step 69 will be described with reference to FIG. 19, which shows illustrative conversions by preset membership functions. In the drawing, a case in which the dissolved oxygen concentration (hereinafter abbreviated as "DO") is high is illustrated as a representative of D2. Further, "high", "usual" and "lower" states of DO are converted into converted values D2H, D2M, D2L by membership conversion functions 692H, 692M, 692L, respectively. Incidentally, these converted values D2H, D2M, D2L are collectively called, and represented by a symbol DF2. The axis of abscissas of each conversion function indicates DO as (2) the quantities of state of the process, while the axis of ordinates shows their degrees by values ranging from 0 to 1. As one example, a description will be made of the membership conversion function 691L. The membership value corresponding to DO value=0.5 is 0.9. This means that, when DO value=0.5, the degree (membership value) is 0.9, in other words, this means that the "DO value is low". By defining a membership function for each variable in advance in this manner, the data rows D1, D2, D3, D4 are converted into their corresponding membership values, thereby obtaining DF2, DF3, DR4. Although DO was classified into three states "high", "usual" and "low" in this embodiment, DO can be classified into any desired number of states.

The operation of the learning neural network 71 in the learning step will hereinafter be described. The learning neural network 71 performs learning upon receipt of the membership values. The manner of these data selection and learning will be described below. Going back to the past from a given time point t=t1 with respect to DF1 (i.e., D1H, D1M, D1L) to DF4 (i.e., D4H, D4M, D4L), the pattern data at t1-1, t1-2, . . . are learned at first. Similarly, using t=t2 (t2≠t1) as a basis, the pattern data at t2-1, t2-2, . . . are learned. Accordingly, q pieces of pattern data are learned in total. These q pieces of patterns may preferably be selected from typical patterns in the past. Since the time point ti is a given time point, continuous learning makes it possible to automatically acquire new fuzzy rules which can cope with new situations.

The learning is effected by dividing this group of data into input data and teacher data. The input layer 710 is inputted successively with DF1(t) and DF3(t) at the given time point t (t=t1, t2, . . . ) and DF1(t-1) to DF4(t-1) at a time point gone back from the time point t to the past. It is to be noted here that DF3(t-1) and DF4(t-1) are added. Then, a similar operation is performed with respect to the pattern data at t=t-2, t-3, . . . . On the other hand, the teacher layer 750 is inputted with D3(t) and D4(t). Although (3) DF3(t) and (4) DF4(t) were inputted to the teacher layer in the present embodiment, the advantageous effects of the present embodiment will not be lost which one or more of the variables (1) to (4) are inputted to the teacher layer. The learning is carried out at the learning neural network 71 which is constructed of the input layer 710, the hidden layer 720, the output layer 730, the comparison layer 740 and the teacher layer 750.

In the fuzzy rule acquisition step 73, the fuzzy rules among the variables (1), (2), (3) and (4) are converted into symbols or words on the basis of 71S1 and 71S2. The certainty factor of a rule relating to a variable i to be set in the input layer 710 and a variable j to be set in the output layer 730 is calculated in accordance with the following formula (viii). Incidentally, the formula (viii) has been derived by the present inventors by a mathematical analysis.

$$Iji = \sum_{k=1}^{m} Wjk(3 \leftarrow 2) \cdot Wki(2 \leftarrow 1) \qquad (xiii)$$

where Iji: certainty factor, and m: the number of neuron element models in the hidden layer.

The calculation of the formula (viii) is to obtain the sum of the products of weight factors of all routes extending from the input layer to the output layer. The rule representing the relationship between the ith input and the jth output is established corresponding to the certainty factor Iji. Iji is calculated with respect to each of the combinations between the input layer and the output layer. The results are converted as a candidate fuzzy rule into the Japanese language. For example,

[Candidate fuzzy rule]: [If the ith input is large, the jth output will be large with the certainty factor Iji.]

This conversion can be effected in such a way that the rules are successively outputted with the rule having the largest certainty factor Iji first and the rules are then converted into combined candidate rules as shown below:

[Candidate fuzzy rule]: [If the ith input is large and the kth input is also large, the jth output will be large with the certainty factor=(Iji+Ijk/2.]

In the fuzzy rule diagnosis step 74, each candidate fuzzy rule obtained in the fuzzy rule acquisition step 73 is judged in reasonability pursuant to instructions from the operator and the communication means 46. When judged reasonable, the candidate fuzzy rule is stored in the fuzzy rule base 60A. Otherwise, the candidate fuzzy rule is stored in the candidate fuzzy rule base 60B. Even in the case of a candidate fuzzy rule once stored in the candidate fuzzy rule base 60B, if it occurs plural times, the number of its occurrence is counted. When the number exceeds a predetermined number (for example, twice), an enquiry is made again to the operator via the communication means 46 and the fuzzy rule diagnosis step 74 is repeated.

The fuzzy rule base in this embodiment contains information on relationships such that, for (1) each disturbance and (2) each quantity of state of the process, (3) what quantities of evaluation are obtained and (4) how the process should accordingly be operated. Depending on the combination of these variables to be assigned to the input layer and the output layer, a desired fuzzy rule can be extracted based on a desired combination of the variables (1) to (4).

The fuzzy inference system 61 performs inference upon receipt of data from the fuzzy rule base 60A and fuzzy rule base 60C, and outputs signals 61S to the operation control step 75. Production rules or fuzzy rules, which have been acquired in advance by a conventional method, i.e., by an interview to the operator 101, are stored beforehand in the fuzzy rule base 60C. The fuzzy rule base 60C can be used as an auxiliary whenever needed. The fuzzy inference system 61 performs a forward or backward inference on the basis of a rule.

A description will next be made of the predicting step which makes use of the prediction neural network 72. The construction of the predicting neural network 72 is as shown in FIG. 6. As is illustrated in FIG. 18, the predicting neural network 72 receives the results of the learning at the learning neural network 71, namely, the values of the weight factors Wji(3←2) and Wji(2←1) as signals 71S1 and 71S2. Although the learning neural network 71 and the predicting neural network 72 are illustrated separately for the description of their respective processing flows in FIG. 18, a single neural network can of course be employed commonly.

The operation of the predicting neural network 72 will next be described. The predicting neural network 72 has a construction similar to the learning neural network 71 except for the omission of the comparison layer 740 and the teacher layer 750. At the predicting neural network 72, unknown values of the above variables (3) and (4) are predicted corresponding to values of the variables (1) and (2). For this purpose, variable values Yi(DF1(0),DF2(0)) set using t=0 as a basis and variable values Y1(DF1(i) to DF5(i), i=-1, -2, . . . ) set using t=-1, -2, . . . as bases are inputted as input patterns to the input layer 710 at first. These variable values Yi include [1] the known values of the variables (1) and (2) at the present time and [2] the values of the variables (1) to (4) in the past (t=-1, -2, . . . ). It is to be noted that all of these values are either actual values or known data. Based on these values, the calculations of the above formulae <1>–<4> are executed, and (4) unknown quantities of evaluation of process state (the quality of treated water) DF4(0)* and (5) unknown process operation quantities (return/surplus sludge quantities, aerating air quantity) DF5(0)* are outputted to the output layer 730. The predicted value of the variable (3) is displayed as a guidance at the communication means 46, while the predicted value of the variable (4) is outputted as control signals 72S to the operation control step 75.

The operation control step 75 will hereinafter be described. In the operation control step 75, the signals 72S of DFS(0)* and the signals 61S from the fuzzy inference system 61 are received, and their conformability is then investigated. Unless the signals 72S contradict the signals 61S, the signals 75S are outputted as target values of the process operating quantities to the surplus sludge pump 16C2, return sludge pump 16C1, blower 17Z, control valves 17X, 17Y, etc. If they contradict each other on the contrary, this is reported to the operator 101 via the communication means 46 so as to add a correction. Incidentally, the frequency of control is every hour in this embodiment. This time interval can however be set as desired. Of course, a shorter time interval leads to a more improved prediction accuracy. If the chlorine feeding rate for a short time period (e.g., 1 minute) cannot be predicted because of the setting of an unduly long time interval (1 hour in this embodiment), it should be predicted by mathematical interpolation. At the same time, the signal 75S indicative of the target value of the feeding rate (the results of the prediction) is displayed at the communication means 46, whereby the actual operation may be corrected at the choice of the operator 101 as needed.

The present invention has been described taking the sewage treatment process by way of example. Needless to say, the present invention can also be applied to general processes.

According to this embodiment, the guidance and control of an operation can be performed by automatically acquiring fuzzy rules from actual data in the past and effecting prediction by a neural network. It is therefore possible to conduct, with a smaller labor and easily from the viewpoint of engineering, "an operation which conforms with the actual results and precedence but is equivocal" which is practiced by an operator. Since learning can be performed at any time, it is possible to learn and control promptly following variations in situations.

The present invention has been described on the basis of the embodiments or examples directed to the water purifying plant. The basic concept of the present invention can however be applied to processes dealing with one or more phenomena which vary with time, for example, sewage or waste water treatment processes, river information processing processes, combined co-generation systems, indoor environment control systems such as building management systems and air conditioning, elevator management systems, meteorological information processing processes, thermal, nuclear and hydraulic power generation processes, transport operation management systems such as train operation management systems, public service system such as map information systems, production processes such as chemical processes, biological processes, semiconductor fabrication processes and food production processes, security/exchange information processing processes, information systems such as bank management information processes, computerized control systems, terminal management systems, computer network management systems, and the like.

INDUSTRIAL APPLICABILITY

According to the present invention, a high-accuracy operation supporting system can be constructed rather easily by using a neural circuit model for the support of an operation of a process. Knowledge which is contained, without being noticed, in information on the history of operations in the past can be easily extracted from a learned neural circuit model for use in supporting an operation.

We claim:

1. A method for supporting an operation of a process by obtaining knowledge between state quantities from a time-dependent process and supporting the operation of the process using knowledge, said method comprising the steps of:

providing a neural circuit model for outputting an operation quantity of the process in accordance with a disturbance, a state quantity of the process and an evaluated quantity of the process, said neural circuit model being of a layer structure having an input layer, at least once hidden layer and an output layer;

converting values of at least one of an operation quantity, disturbance, state quantity and evaluated quantity at plural time points in the past in accordance with a preset membership function whereby a value of at least a disturbance or a state quantity or of said operation quantity, disturbance, state quantity and evaluated quantity is inputted to the input layer, and having the neuron circuit model learn by using a value of at least one of said operation quantity, disturbance, state quantity and evaluated quantity, which value corresponds to the value inputted, as a teacher pattern for the output layer so that a fuzzy rule with a certainty factor, said fuzzy rule describing at least two relationships of those between said operation quantity, disturbance, state quantity and evaluated quantity, is output; and supporting or controlling the operation of the process by using the fuzzy rule with the certainty factor.

2. An apparatus for supporting an operation of a process by obtaining knowledge between state quantities from a time-dependent process and supporting the operation of the process using knowledge, said apparatus comprising:

a storage for storing time-dependent data concerning a disturbance, a state quantity of the process and evaluated quantity of the process;

a converter for converting values of at least one of an operation quantity of the process, a disturbance, a state quantity of the process and an evaluated quantity of the process at plural time points in the past in accordance with a preset membership function;

a neural circuit model for outputting the operation quantity of the process in accordance with the disturbance, the state quantity of the process and the evaluated quantity of the process, said neural circuit model being of a layer structure constructed of an input layer, at least one hidden layer and an output layer, a value of at least one of the disturbance and the state quantity of the process being inputted to the input layer, said neural circuit model performing learning by using, as a teacher pattern for the output layer, a value of at least one of the operation quantity of the process, the disturbance, the state quantity of the process and the evaluated quantity of the process, which value corresponds to the value inputted, so that a fuzzy rule with a certainty factor is outputted, said fuzzy rule for describing at least two relationships of those between the operation quantity of the process, the disturbance, the state quantity of the process and the evaluated quantity of the process; and one of a supporter and a controller, said supporter supports the operation of the process by using the fuzzy rule with the certainty factor, said controller controls the operation of the process by using the fuzzy rule with the certainty factor.

* * * * *